(12) United States Patent  
Hassler, Jr. et al.

(10) Patent No.: US 7,900,800 B2  
(45) Date of Patent: Mar. 8, 2011

(54) DISPENSING APPARATUS WITH HEAT EXCHANGER AND METHOD OF USING SAME

(75) Inventors: William L. Hassler, Jr., Carlsbad, CA (US); Jon Tedrow, San Diego, CA (US); Robert James Wright, Carlsbad, CA (US)

(73) Assignee: Nordson Corporation, Westlake, OH (US)

( * ) Notice: Subject to any disclaimer, the term of this patent is extended or adjusted under 35 U.S.C. 154(b) by 649 days.

(21) Appl. No.: 11/875,150

(22) Filed: Oct. 19, 2007

(65) Prior Publication Data

US 2009/0101669 A1    Apr. 23, 2009

(51) Int. Cl.  
*B67D 7/80* (2010.01)
(52) U.S. Cl. .................................... 222/146.5; 222/593
(58) Field of Classification Search ............... 222/146.5, 222/146.2, 1, 146.1, 61, 593, 592, 590, 559, 222/510, 518, 494, 495, 309, 398; 165/155; 219/420–427

See application file for complete search history.

(56) References Cited

U.S. PATENT DOCUMENTS

| | | | |
|---|---|---|---|
| 4,009,974 A * | 3/1977 | Scholl | 418/181 |
| 4,066,188 A | 1/1978 | Scholl et al. | |
| 4,474,311 A * | 10/1984 | Petrecca | 222/146.5 |
| 4,771,920 A * | 9/1988 | Boccagno et al. | 222/146.5 |
| 5,645,743 A * | 7/1997 | Zook | 219/422 |
| 6,952,524 B2 * | 10/2005 | Bissonnette et al. | 392/484 |
| 7,190,893 B2 * | 3/2007 | Kuebler et al. | 392/485 |
| 2006/0157517 A1 | 7/2006 | Fiske et al. | |

* cited by examiner

*Primary Examiner* — Lien T Ngo  
(74) *Attorney, Agent, or Firm* — Wood, Herron & Evans, L.L.P.

(57) ABSTRACT

An apparatus for dispensing a viscous material includes a dispenser body having an inlet and a discharge orifice. A valve element is mounted for movement in the dispenser body between an open position allowing flow from the discharge orifice, and a closed position preventing flow therefrom. An actuator is coupled to the valve element for actuation between the open and closed positions. A heat exchanger having a serpentine passage and a heater is coupled thereto, wherein the heater is in thermal communication with the dispenser body. The passage is configured to deliver the viscous material to the inlet at a uniform temperature. A method of dispensing a viscous material includes positioning a heat exchanger, having a fluid passage and a heater, in thermal communication with the dispenser body, and heating the material flowing through the fluid passage to a uniform temperature prior to delivering it to the inlet.

12 Claims, 12 Drawing Sheets

DISPENSING APPARATUS WITH HEAT EXCHANGER AND METHOD OF USING SAME

TECHNICAL FIELD

Aspects of the invention generally relate to the field of dispensing viscous materials for a variety of purposes and, more particularly, to apparatus and methods of dispensing discrete amounts of viscous materials onto a workpiece.

BACKGROUND

In the manufacture of microelectronic hardware and other products, automated dispensing apparatus are typically used to dispense small amounts of droplets of a highly viscous material in a non-contact manner onto a substrate or workpiece. Exemplary highly viscous materials include, but are not limited to, greases, lubricants, sealants, epoxies, solder flux, solder paste, adhesives, solder mask, thermal compounds, cyanoacrylates, under-fills, oil, encapsulants, potting compounds, inks, silicones, and other viscous materials. Generally, such highly viscous materials cannot easily flow under their own weight at room temperature.

Conventional automated non-contact dispensing apparatus for viscous materials include an air-operated valve element, such as a needle, reciprocated for selectively engaging a valve seat surrounding a discharge passageway. In a process commonly referred to as jetting, droplets are dispensed by retracting the needle from contact with the valve seat, which allows an amount of the viscous material to flow under pressure from a filled fluid chamber through a gap separating the needle from the valve seat and into the discharge passageway. The needle is then moved rapidly toward the valve seat to close the dispensing apparatus, which causes the amount of viscous material to be forced through the discharge passageway and a comparable amount of the viscous material to be ejected from a discharge orifice of the discharge passageway. The small amount of ejected viscous material is propelled as a droplet toward a workpiece, which is spaced from the discharge outlet. In many industrial applications, it is desirable to apply these highly viscous materials to the workpiece in a controlled and consistent manner. For example, it may be desirable to dispense a specified amount (e.g., by weight or volume) of viscous material onto the workpiece. Fluctuations in material temperature and/or non-optimal operating temperatures may cause undesirable problems during the dispensing of the viscous material.

More particularly, the viscosity of a material is an important property that significantly affects the overall quality and consistency of the dispensing process. Viscosity is generally dependent on temperature, and is typically inversely related to temperature. Thus, as the operating temperature increases, the material typically becomes less viscous, and vice versa. In many dispensing apparatus, the stroke of the needle (e.g., the gap between the needle and valve seat) may be selected to deposit a desired amount of the viscous material onto the workpiece. This may be done, for example, by assuming an ideal dispensing temperature and determining the needle stroke corresponding to the desired amount of material to be dispensed onto the workpiece. If, for example, the actual dispensing temperature is higher than the ideal temperature, the viscosity of the material may be lower than expected and consequently more material may be dispensed onto the workpiece than desired. On the other hand, if the actual dispensing temperature is less than the ideal temperature, the viscosity of the material may be higher than expected and consequently less material may be dispensed onto the substrate than desired. A variation in dispensing temperature of as little as 1-2 degrees Celsius may cause significant changes in the consistency of the dispensing process. Such variations may cause more or less weight or volume of material to be dispensed and may further affect the coverage area and edge definition of the droplet on the workpiece.

In a conventional dispensing apparatus, a heater is typically positioned adjacent the tip or dispensing orifice of the apparatus for heating the viscous material prior to dispensing an amount onto the workpiece. In many situations, however, the heater is not capable of bringing the viscous material up to its ideal dispensing temperature before being dispensed therefrom. This may be due, for example, to high flow rates of the viscous material through the apparatus, the thermal properties of the material, including thermal conductivity, specific heat, etc., or other factors. In any event, and as discussed above, the inability to reach or sustain the ideal dispensing temperature may significantly affect the quality (e.g., weight, volume, edge definition, etc.) of the dispensed liquid.

Some prior dispensing systems have incorporated auxiliary heaters for heating the viscous material prior to its delivery to the dispensing apparatus. By way of example, in some applications an in-line heater may be positioned in the fluid conduit line that feeds the viscous material to the dispensing apparatus. In other applications, such as hot melt adhesives, the fluid conduit line may be configured as a heated hose. In these applications, however, there is typically a cold junction between the fluid conduit line and the dispensing apparatus that results in temperature variations in the viscous material. Moreover, the residence time of the viscous material in the in-line heater or heated hose may not be sufficient to heat a substantial portion of the viscous material to or near the ideal dispensing temperature. The temperature variations caused by the cold junctions and insufficient residence time in the auxiliary heaters may not be capable of being accommodated by the heater at the tip of the dispensing apparatus, thus resulting in an inconsistent dispensing process.

Furthermore, once the viscous material is delivered to the fluid filled chamber in the dispensing apparatus, the material is susceptible to heat loss through the body of the apparatus resulting in additional temperature variations in the viscous material. Again, the heater at the tip of the dispensing apparatus may be inadequate to uniformly heat the viscous material in the fluid-filled chamber at or near the ideal dispensing temperature due to the heat loss while the viscous material is resident in the fluid chamber.

Accordingly, there is a need for an improved apparatus and method for dispensing discrete amounts of viscous material onto a workpiece in a more isothermal manner.

SUMMARY

An embodiment of the invention that addresses these and other drawbacks provides an apparatus for dispensing a viscous material including a dispenser body having a material inlet, a discharge orifice, and a fluid chamber in communication with the inlet and discharge orifice. The fluid chamber includes a valve having a valve seat positioned between the inlet and discharge orifice. A valve element, such as a needle, is mounted for reciprocating movement in the dispenser body between an open position, in which the valve element is disengaged from the valve seat thereby allowing material flow from the discharge orifice, and a closed position, wherein the valve element is engaged with the valve seat thereby preventing material flow from the discharge orifice. An actuator, such as a pneumatically driven air piston, may be operatively coupled to the valve element for actuating the valve element between the open and closed positions and thereby selectively dispense the viscous material from the discharge orifice. The apparatus further includes a heat exchanger including a heater and a fluid passage and coupled to the dispenser body such that the heater is in thermal communication with the dispenser body. The fluid passage includes an inlet, an outlet, and a serpentine path configured to deliver the viscous material flowing through the passage to the inlet at a pre-determined, substantially uniform or isothermal temperature.

In one embodiment, the heat exchanger may be integrally formed with the dispenser body and the fluid passage may be defined by at least one substantially cylindrical bore formed in the body portion. More specifically, the cylindrical bore may include a plurality of elongate axial portions interconnected by relatively short leg portions to define the serpentine path.

In another embodiment, the heat exchanger may include a fluid transport module having a fluid passage with an inlet, an outlet, and defining a generally serpentine path through the heat exchanger, and a heating module having a heater in thermal communication with the fluid passage in the fluid transport module for heating the viscous material flowing therethrough. In such an embodiment, at least the fluid transport module may be selectively removable from the dispensing apparatus. In addition, the fluid transport module and heating module may be formed integral with each other or alternatively, may be separable from each other. The serpentine fluid passage may be at least in part formed by a plurality of fins. The finned design may increase the surface contact area between the heat exchanger and the viscous material and thereby accommodate increased flow rates therethrough.

To provide access to the fluid passage in the heat exchanger, such as for cleaning or other purposes, in one embodiment, the heat exchanger may include at least one access port having a removable plug positioned therein. The plug is selectively removable from the access port to provide access to the fluid path. In an alternate embodiment, the heat exchanger may include a cover plate that is removable therefrom to provide access to the fluid passage. The cover plate may be coupled to the heat exchanger in a tool-less manner. In either embodiment, however, the ports/plugs or the cover plate may be configured such that substantially the entire fluid passage may be accessed.

In one embodiment, at least a portion of the heat exchanger may be coupled to the dispensing apparatus in a tool-less manner. In this regard, the dispensing apparatus may include a clamping mechanism that, for example, clamps at least the fluid transport module to the dispensing apparatus. The clamping mechanism may also clamp the heating module to the dispensing apparatus. The clamping mechanism may include a lever arm movable between an open position and a closed position, wherein at least a portion of the heat exchanger (e.g., fluid transport module) is clamped to the dispensing apparatus when in the closed position and the portion released from the dispensing apparatus when in the open position. The lever arm may be coupled to a cam mechanism capable of rotation between a first and second position when the lever arm is moved between the closed and open position, respectively. A transmission member converts or transforms the rotational motion of the cam mechanism to movement along an axis, such as a generally vertical axis (i.e., up/down movement). A clamping member is coupled to the transmission member and moves therewith between a first position when the lever arm is in the closed position and a second position when the lever arm is in the open position. When the clamping member is in the first position, the clamping member engages a portion of the heat exchanger to clamp the portion to the dispensing apparatus. When in the second position, the clamping member releases the portion of the heat exchanger from the dispensing apparatus. Moreover, the clamping mechanism may include an adjustment feature that allows the clamping force between the clamping member and the portion of the heat exchanger to be adjusted.

A method of dispensing a viscous material onto a workpiece using a dispensing module having a material inlet, a discharge orifice, and a fluid chamber in fluid communication with the inlet and discharge orifice includes positioning a heat exchanger including a serpentine fluid passage and a heater in thermal communication with a body of the dispensing module, and using the heater to heat the viscous material flowing through the fluid passage to a pre-determined, substantially uniform temperature prior to delivering the material to the inlet of the fluid chamber. For example, the pre-determined, substantially uniform temperature may be approximately equal to the ideal temperature for dispensing the desired amount (e.g., by volume or weight) of viscous material. So that substantially all of the viscous material flowing through the heat exchanger achieves the desired uniform temperature, the viscous material may be maintained in the heat exchanger for a residence time that meets a specified time constraint. For example, the heat exchanger may be configured such that the resident time of the viscous material therein at the maximum design flow rate is at least two (2), and preferably at least three (3), times greater than the thermal time constant of the viscous material in the heat exchanger.

The method may further include using the heater in the heat exchanger to provide heating to the viscous material resident in the fluid chamber of the dispensing module. For example, a conduction path may exist between the heater and the fluid chamber such that heat from the heater may be readily conducted thereto. Moreover, a second heater may be provided on the dispensing module spaced from the heat exchanger heater, such as adjacent the dispensing orifice thereof, for also heating the viscous material in the fluid chamber. In this way, the dispensing module may be more isothermal and temperature variations of the viscous material may be eliminated or reduced while the viscous material is resident in the fluid chamber.

The method may further provide for cleaning the fluid passage in the heat exchanger of viscous material. For example, the heat exchanger may be configured such that substantially the entire fluid passage may be cleaned. Moreover, in one embodiment, this may be achieved without removal of the heat exchanger from the dispensing apparatus. In another embodiment, this may be achieved by removing the fluid transport module from the dispensing apparatus and then removing the cover plate to access the fluid passage. The fluid transport module may be clamped or released from the dispensing apparatus in a tool-less manner, such as with a clamping mechanism.

These and other objects, advantages and features of the invention will become more readily apparent to those of ordinary skill in the art upon review of the following detailed description taken in conjunction with the accompanying drawings.

BRIEF DESCRIPTION OF THE DRAWINGS

The accompanying drawings, which are incorporated in and constitute a part of this specification, illustrate embodiments of the invention and, together with a general descrip

DETAILED DESCRIPTION

Figure 1:
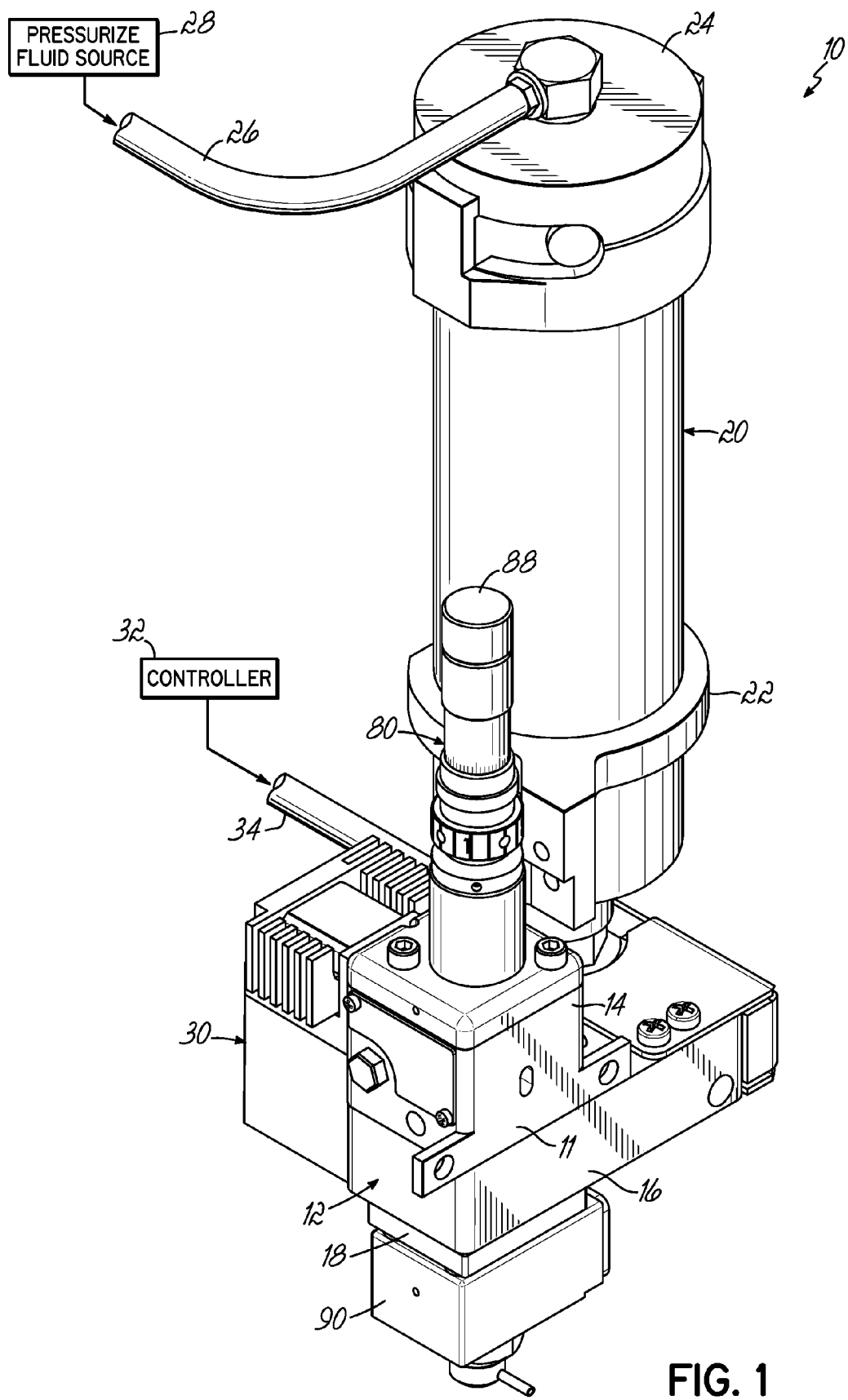
- FIG. 1 is a perspective view of a dispensing apparatus in accordance with an embodiment of the invention.

With reference to FIG. 1, a dispensing apparatus 10 for use with a computer-controlled non-contact dispensing system is shown. The dispensing apparatus 10 may be installed in dispensing systems including those similar, or identical to, the dispensing systems described in U.S. Pat. No. 5,747,102. Dispensing apparatus 10 may be particularly useful when installed in the Asymtek X-1010 Axiom™ SMT Dispenser, The Asymtek X-1020 Axiom™ Semiconductor Dispenser, or the Asymtek M-2010 Millennium® Ultra High Speed SMT Dispenser. The dispensing apparatus 10 includes mounting structure 11 as is generally known in the art for attaching the dispensing apparatus 10 to a mechanical support of the dispensing system.

The dispensing apparatus 10 includes a dispensing module, generally indicated by reference numeral 12, having an upper body 14, a main body 16, and a lower body 18 which may be coupled by conventional means, such as threaded fasteners, to form the module 12. As shown in FIG. 1, the dispensing apparatus 10 also includes a fluid supply or reservoir 20 for containing a viscous material to be dispensed and which is in fluid communication with the dispensing module 12. A suitable bracket 22 may be provided to support the reservoir 20 relative to the dispensing module 12. The reservoir 20 further includes a removable cap 24 to provide access to the interior of reservoir 20 to, for example, add or remove viscous material. As illustrated in FIG. 1, the cap 24 may be coupled to the body of the reservoir 20 via a bayonet type of connection, as is generally known in the art. As further illustrated in FIG. 1, the cap 24 may be coupled to a fluid conduit line 26 in fluid communication with a pressurized fluid source, shown schematically at 28, for pressurizing the viscous material in reservoir 20. The reservoir 20 may be a disposable syringe or cartridge, and the material filling the reservoir 20 may be any highly viscous material including, but not limited to, greases, lubricants, sealants, epoxies, solder flux, solder paste, adhesives, solder mask, thermal compounds, cyanoacrylates, under-fills, oil, encapsulants, potting compounds, inks, silicones, and other viscous materials. The reservoir 20 typically includes a follower or plunger (not shown) movable upon application of pressure (e.g., air pressure), typically between 5 psi and 30 psi, in the head space above the plunger and as supplied by pressurized fluid source 28.

Figure 3:
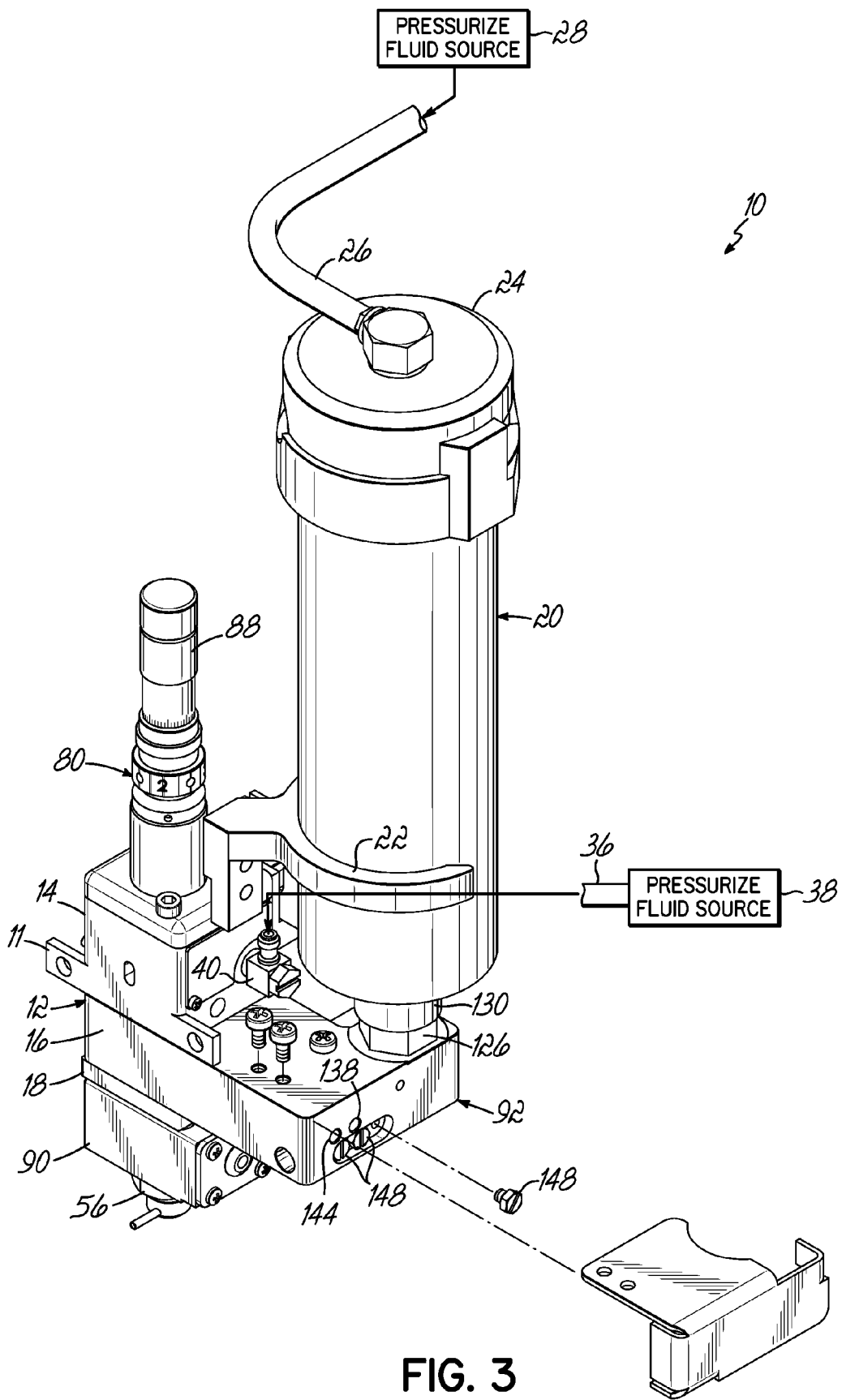
FIG. 3 is another perspective view of the dispensing apparatus shown in FIG. 1.
Figure 4:
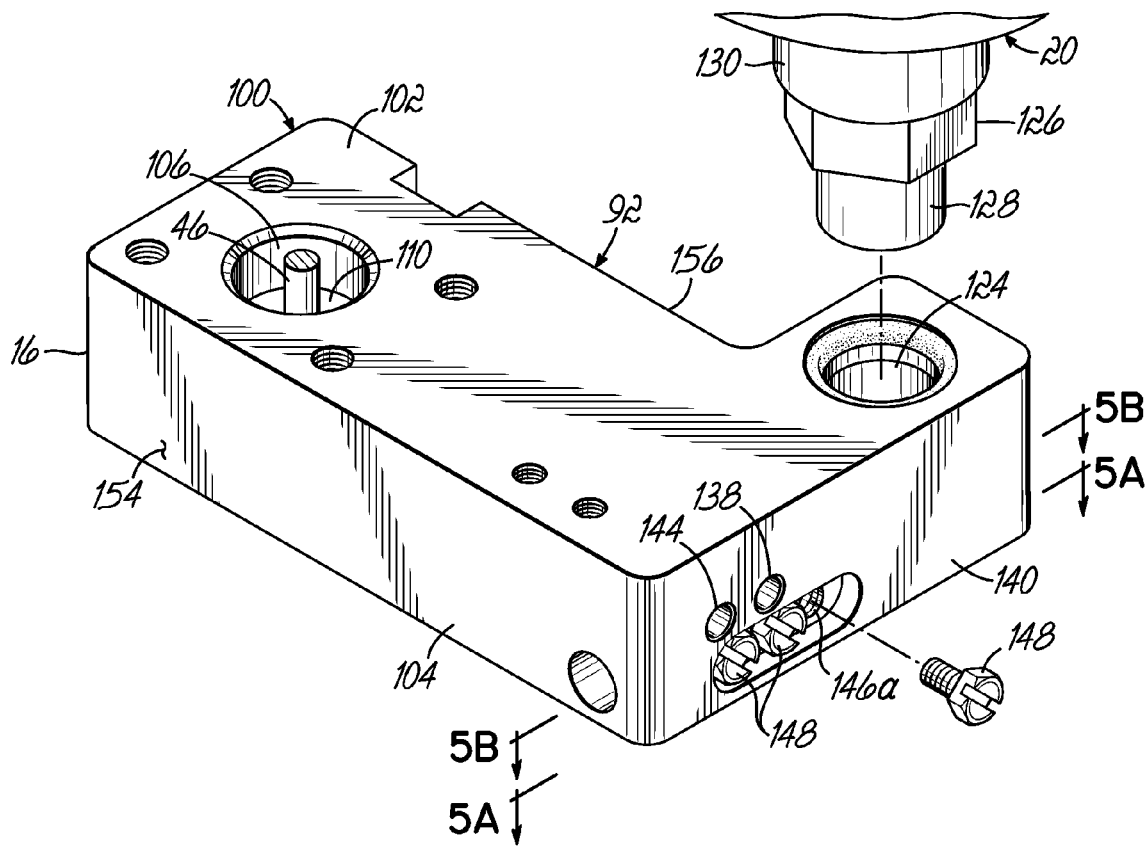
FIG. 4 is a perspective view of the heat exchanger in the dispensing apparatus shown in FIG. 1.

The dispensing apparatus 10 further includes a solenoid valve 30 coupled to dispensing module 12 in a conventional manner for actuating the dispensing apparatus 10. The solenoid valve 30 is typically operatively coupled to a central controller, shown schematically at 32, via an electrical cable 34, for controlling the operation of the dispensing apparatus 10. The controller 32 may comprise any electrical control apparatus configured to control one or more variables based upon one or more inputs. A number of individual control systems may be used to control various components, and these individual control systems may be integrated, or otherwise considered to collectively constitute a single combined controller 32. An exemplary controller 32 includes programmable logic control (PLC) devices having easily used human machine interfaces (HMI), as are known to persons of ordinary skill in the art. In reference to FIG. 3, a fluid conduit line 36 in fluid communication with a pressurized fluid source 38 supplies pressurized fluid (e.g., air) to a fluid manifold (not shown) in dispensing module 12 via fitting 40, which is in fluid communication with solenoid valve 30. The solenoid valve 30 is then energized and de-energized by electrical signals supplied from controller 32 over electrical cable 34 to supply pressurized fluid for opening and closing the pneumatically-operated dispensing apparatus 10 as discussed in more detail below.

Figure 2:
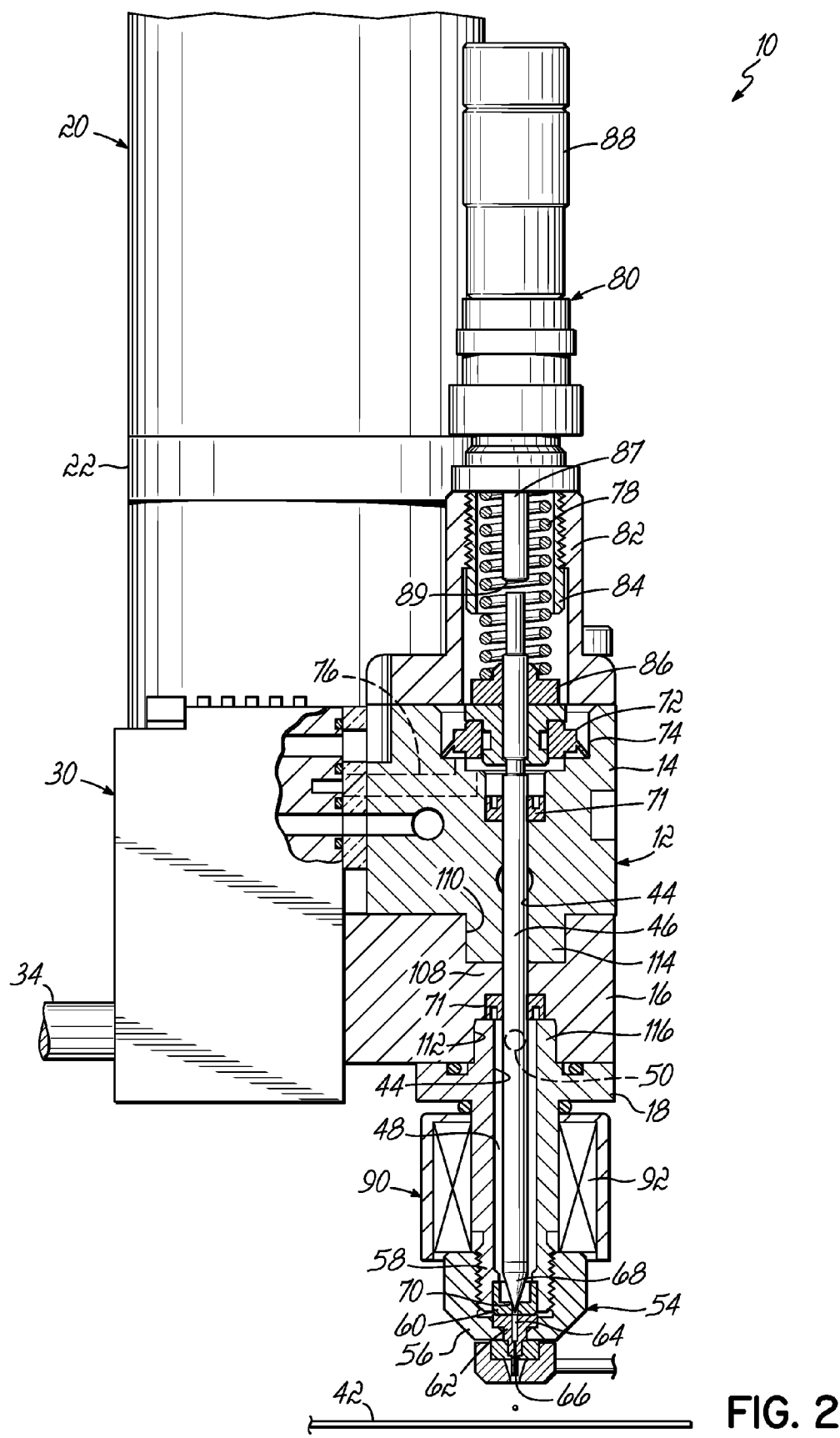
FIG. 2 is a cross-sectional view of the dispensing apparatus shown in FIG. 1.

In reference to FIG. 2, the dispensing apparatus 10 is operative for dispensing pressurized viscous material supplied from reservoir 20 onto a substrate or workpiece 42. In this regard, the dispensing module 12 includes a central longitudinal bore 44 having a valve element, illustrated as a needle 46, positioned therein and capable of reciprocating axial movement relative thereto. As illustrated in FIG. 2, the central bore 44 extends through each of the upper body 12, main body 14 and lower body 16 of the dispensing module 12. A portion of the central bore 44 defines a fluid-filled chamber 48 having an inlet 50 in fluid communication with the reservoir 20 and an outlet in communication with a nozzle assembly 54 at the dispensing end of the dispensing module 12 that facilitates dispensing of the viscous material. The nozzle assembly 54 includes a nozzle hub 56 that threadably engages an end portion 58 of the lower body 18. Captured between the nozzle assembly 54 and the end portion 58 of lower body 18 is a valve seat 60 and a dispensing tip 62 that defines a discharge path 64 and a discharge orifice 66, from which the viscous material is dispensed.

The needle 46 is capable of reciprocating movement between an open position, wherein viscous material is permitted to be dispensed from the dispensing apparatus 10, and a closed position, wherein viscous material is prevented from being dispensed from the dispensing apparatus 10. To this end, the needle 46 includes a tip 68 adapted for sealing engagement with valve seat 60 to prevent material flow from the fluid chamber 48 into the discharge path 64, and out of the discharge orifice 66 when in the closed position. For example, the needle tip 68 may be configured as a sharpened point that cooperates with an aperture 70 in the valve seat 60 to prevent any viscous material from flowing thereby when in the closed position. As recognized by those of ordinary skill in the art, the needle tip 68 and valve seat 60 may have other configurations that cooperate in a manner that prevents material flow when the needle tip is so engaged with the valve seat. When in the opened position, however, the needle tip 68 is spaced from the valve seat 60 thus allowing viscous material to flow into the discharge path 64 and out of discharge orifice 66. The flow of material through discharge orifice 66 is stopped upon movement of needle 46 to the closed position.

The reciprocating movement of the needle 46 may be achieved via an actuation section of the module 12, such as along an upper portion thereof. As shown in FIG. 2, the actuation section may be configured as a pneumatic type of actuator and may be sealed from the fluid-filled chamber 48 using one or more seals 68, such as lip seals. In one embodiment, an end of the needle 46 opposite the tip 68 is secured within a bore of an air piston 72 that is slidably movable within a cavity 74 of dispensing module 12, such as in upper body 14. An annular seal carried by the air piston 72 provides a fluid-tight sliding seal with the surface defining the cavity 74. A lower side of the air piston 72 is in fluid communication with passageway 76 for receiving pressurized fluid from fluid source 38 when the solenoid valve 30 is energized. The upper surface of the air piston 72 is coupled to a biasing member, such as a coil spring 78, that biases the needle 46 toward the closed position.

The solenoid valve 30 may be mounted directly against the dispensing module body, perhaps with an intervening thermal barrier (not shown). Direct attachment of the solenoid valve 30 to the dispensing module 12 reduces the fluid volume thereby promoting a rapid fluid pressure change to actuate the air piston 72, which decreases the response time for pressurizing/depressurizing the lower surface thereof to open and close the dispensing module 12. As is conventional, the solenoid valve 30 typically includes a movable spool actuated by selectively energizing and de-energizing an electromagnetic coil with an electrical signal from, for example, controller 32. In response to the electrical signal, the solenoid valve 30 selectively switches a flow path for pressurized fluid to a fluid supply port between an inlet port and an exhaust port. The supply port communicates with the air piston 72 via passageway 76. When a suitable electrical signal is applied to solenoid valve 30, pressurized fluid from fluid source 38 is supplied from the inlet port to the supply port, and subsequently to passageway 76. A fluid path to the exhaust port is blocked when the solenoid valve 30 is so energized. When the electrical signal is discontinued, the inlet port is blocked and the exhaust port is in fluid communication with the supply port. Pressurized fluid acting on air piston 72 is serially exhausted through passageway 76, the supply port, and exhaust port. The solenoid valve 30 may be any three-way or four-way valve that operates to switch a flow of pressurized fluid among flow paths as understood by those of ordinary skill in the art.

The actuation section may further include an adjustment assembly 80 for controlling the preload on the air piston 72 and the displacement or stroke length of the needle 46 between the open and closed positions. The adjustment assembly 80 includes a sleeve 82, a load screw 84 threadably engaged with the sleeve 82 and compressing the coil spring 78 so as to apply an axial load to a load button 86 proximate the end of the needle 46 opposite the needle tip 68. The load screw 84, which is secured to the upper body 14 through sleeve 82, is axially movable by rotation relative to upper body 14. The spring 78 is partially compressed and thereby preloaded by adjustment of the axial position of the load screw 84 relative to the sleeve 82. Additionally, a stroke adjustment knob 88 may be affixed to the load screw 84 and include a shaft 87 moveable along an axial direction through rotation of adjustment knob 88. The shaft 87 includes an end surface 89 selectively spaced from the end of needle 46 and adapted to contact the end of needle 46 for defining a stroke length for the needle tip 68 relative to the valve seat 60. Adjusting the stroke length allows the user to set the desired amount of viscous material (e.g., by weight or volume) to be dispensed from dispensing apparatus 10.

As discussed above, the dispensing apparatus 10 may include a heater 90 adjacent the dispensing orifice 66 for heating the viscous material prior to the material being dispensed therefrom and onto the workpiece 42. For example, the heater 90 may include a heating element shown schematically at 92, such as a flexible thermal foil resistance heater element, that surrounds the exterior of the lower body 18. Heat is transferred from the heating element 92 through the wall of the lower body 18 and into the viscous material resident in a lower section of the fluid chamber 48. The heater 90 may further include a layer of insulation outboard of the heating element 92 (e.g., a low thermal conductivity outer shell) that limits heat loss therefrom.

In operation, a viscous material fills the fluid chamber 48 as supplied from reservoir 20 under pressure from fluid source 28. Initially, the lower surface of the air piston 72 is not subjected to pressurized fluid and the bias from spring 78 positions the needle 46 in the closed position so that no material may be dispensed from apparatus 10 (FIG. 2). When it is desired to dispense a discrete amount of viscous material onto the workpiece 42, a suitable signal from controller 32 energizes the solenoid valve 30 so that passageway 76 is in fluid communication with fluid source 38, via the inlet port and supply port in valve 30, and pressurized fluid acts on the lower surface of the air piston 72. The pressure is sufficient to overcome the bias of the spring 78 and move the air piston 72 and needle 46 in a direction that separates the needle tip 68 from the valve seat 60. Contact between the end surface 89 of shaft 87 and the end of needle 46 operates as a stop at the desired needle stroke length. With the needle tip 68 positioned away from the valve seat 60, an amount of viscous material flows from the fluid chamber 48 into the discharge passage 64 of the dispensing tip 62 and out of discharge orifice 66 so as to be deposited on workpiece 42. Discontinuing the signal from the controller 32 then de-energizes the solenoid valve 30 so that the passageway 76 is in communication with the exhaust port in the valve 30 and exhausts the pressurized fluid acting on the lower surface of the air piston 72. Consequently, the bias from spring 78 rapidly urges the needle 46 toward the valve seat 60 and the tip 68 thereof sealing engages with the valve seat 60 to prevent the flow of material thereby.

In a conventional dispensing apparatus, a fluid conduit line typically couples the outlet of the reservoir 20 to the inlet 50 of the fluid chamber 48 in the dispensing module 12. Viscous material is then supplied under pressure from the reservoir 20 through the fluid conduit line and ultimately to fluid chamber 48. As noted above, however, dispensing apparatus of this nature incur temperature variations that may affect the quality and consistency of the dispensing process. To address the shortcomings of existing dispensing apparatus and to reduce or eliminate the undesirable results of such temperature variations, embodiments in accordance with aspects of the invention include a heat exchanger in close proximity to the inlet of the fluid chamber and in thermal communication with the dispensing module. More particularly, the heat exchanger may be in direct thermal communication with the dispensing module. For example, the heat exchanger may be incorporated into the dispensing apparatus so that a relatively large surface area of the heat exchanger has a conduction path to the dispensing module. The heat exchanger is adapted to provide the viscous material to the fluid chamber at a uniform temperature that is at or near the ideal temperature for dispensing the desired amount of viscous material. In this regard, the heat exchanger may be configured to provide a residence time therein to ensure to a relatively high degree that substantially all of the viscous material in the heat exchanger has achieved the desired uniform temperature at the maximum design flow rate of viscous material through the heat exchanger. Moreover, positioning the heat exchanger in close proximity to the inlet to the fluid chamber reduces or eliminates cold junctions that result in undesirable temperature variations. Furthermore, positioning the heat exchanger in thermal communication with the dispensing module makes the dispensing module more isothermal and further reduces the temperature variations that occur while the viscous material is resident in the fluid chamber of the dispensing module.

To this end, and in one embodiment, a heat exchanger 92 may be integrally formed with the module 12. With reference to FIGS. 3-5B, the main body 16 of the module 12 may be configured as a generally L-shaped unitary block member 100 having a module portion 102 and a heat exchanger portion 104. The block member 100 may be formed from aluminum, stainless steel, or other high conductivity materials (e.g., higher than approximately 3 BTU/(hr ft ° F.)) capable of withstanding the structural requirements of module 12. The module portion 102 may be integrated into the module 12 and coupled to upper body 14 along an upper surface thereof and coupled to lower body 18 along a lower surface thereof (FIG. 2). The main body 16 may be coupled to the upper and lower bodies 14, 18 in a conventional manner, such as with threaded fasteners. Module portion 102 includes an aperture 106 therethrough that forms a portion of central bore 44. As shown in FIG. 2, the aperture 106 includes an intermediate annular member 108 that defines an upper cavity 110 and a lower cavity 112. The upper body 14 includes a projecting nose 114 that is positioned in the upper cavity 110 when upper body 14 is coupled to main body 16. In a similar manner, lower body 18 includes a projecting nose 116 that is positioned in the lower cavity 112 when lower body 18 is coupled to main body 16. One or more seals (e.g., O-rings, etc.) may be used to ensure a fluid tight seal between the main body 16 and the upper and lower bodies 14, 18.

Figure 5A:
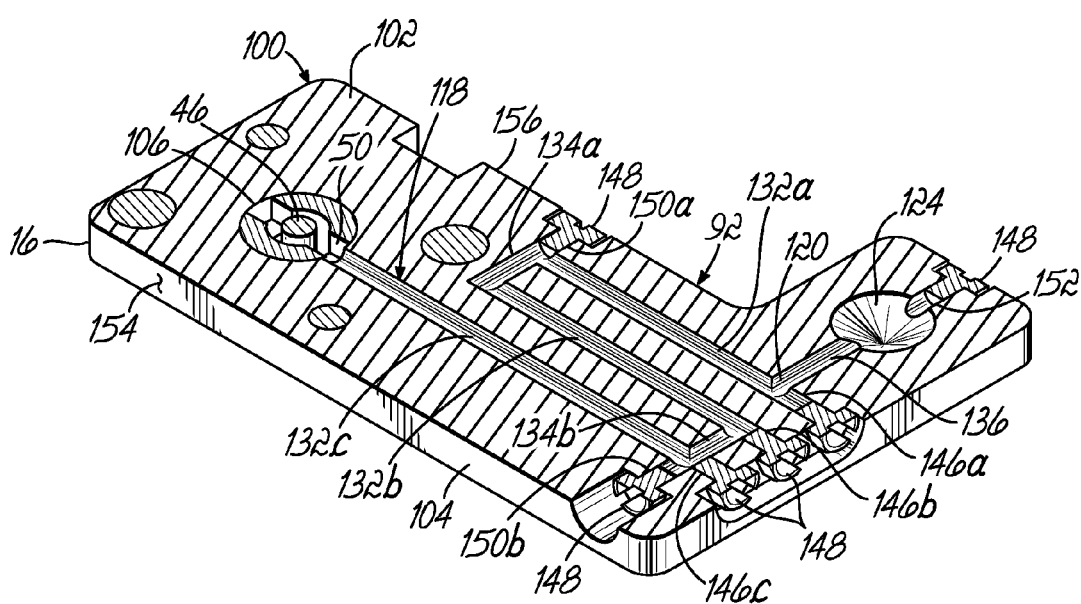
FIG. 5A is a cross-sectional view of the heat exchanger shown in FIG. 4 taken generally along line 5A-5A.
Figure 5B:
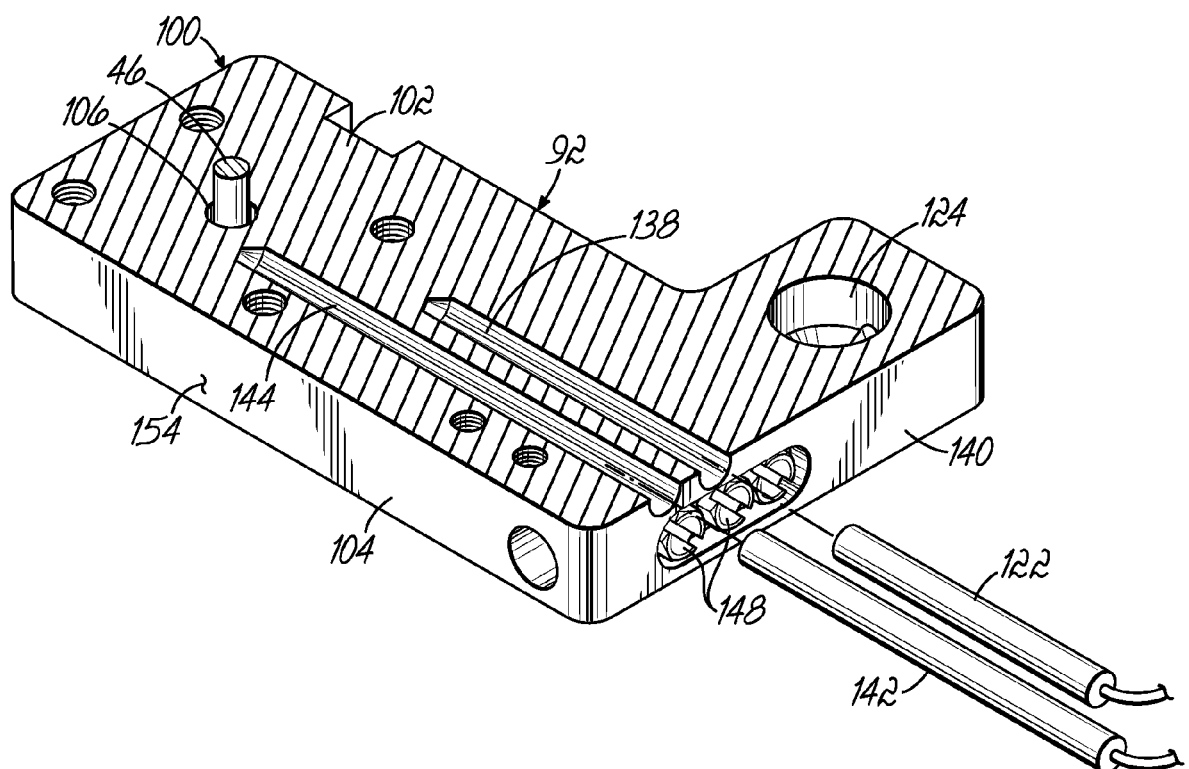
FIG. 5B is a cross-sectional view of the heat exchanger shown in FIG. 4 taken generally along line 5B-5B.
Figure 6:
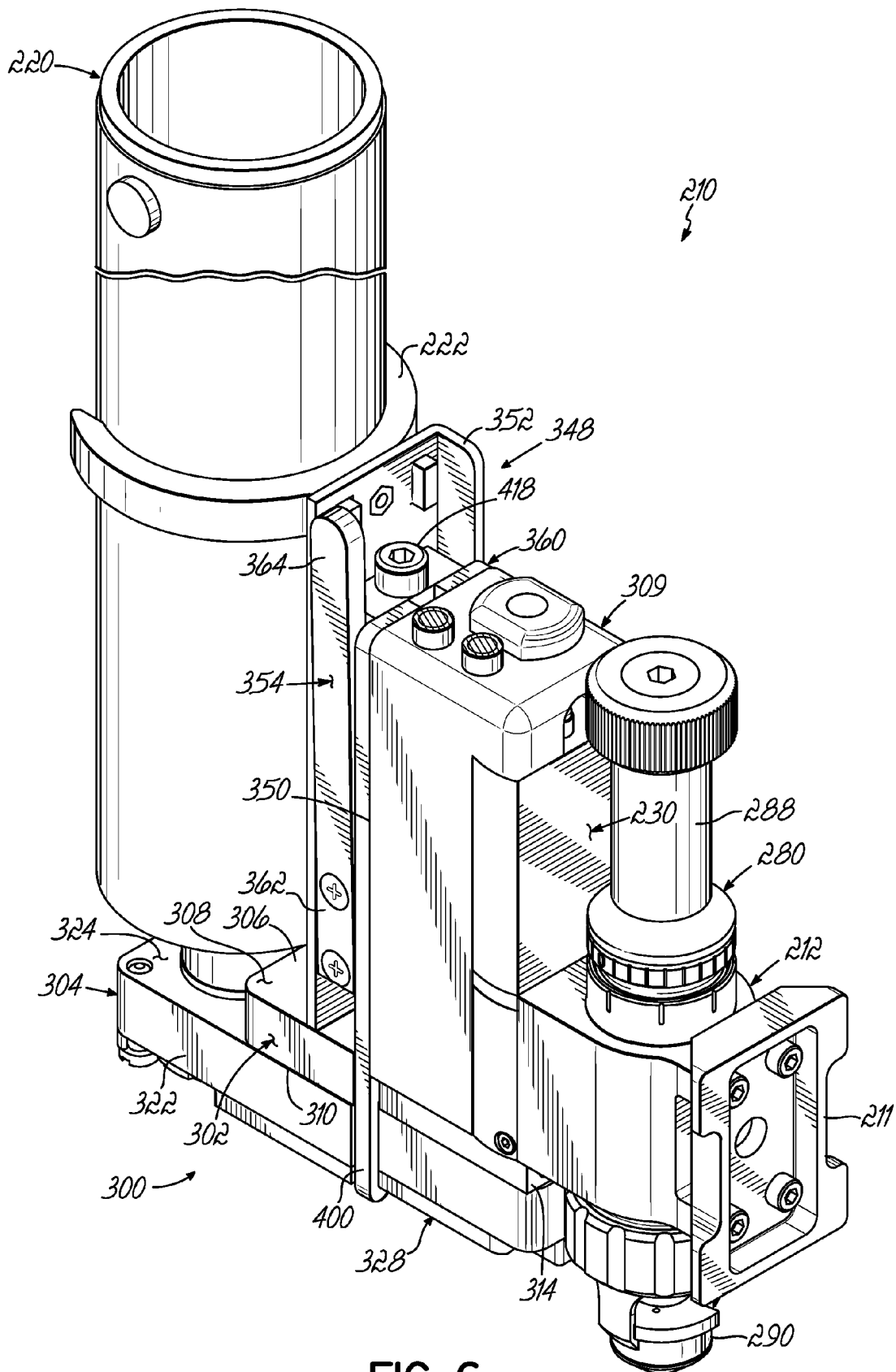
FIG. 6 is a perspective view of another embodiment of a dispensing apparatus in accordance with the invention.

As best illustrated in FIG. 5A, the heat exchanger portion 104 includes a fluid passage 118 extending between an inlet 120 and an outlet that coincides with the inlet 50 to fluid chamber 48. The fluid passage 118 defines a tortuous or serpentine path through the heat exchanger portion 104. For example, the serpentine path may be defined by one or more interconnected generally cylindrical bores formed in heat exchanger portion 104. As best illustrated in FIG. 5B, the heat exchanger portion 104 further includes a heater 122 for heating the viscous material flowing through fluid passage 118. The inlet 120 is in fluid communication with an aperture 124 adapted to receive an end of the reservoir 20 so that the viscous material in the reservoir is in fluid communication with the fluid passage 118. By way of example, such a coupling between the main body 16 and reservoir 20 may be facilitated by a connector 126 having a first end 128 that engages the aperture 124, such as through a threaded connection or a slip fit, and a second end 130 that couples to the reservoir 20 via a threaded connection or slip fit. One or more seals (O-rings, etc.) may be provided to ensure a fluid-tight seal.

As shown in FIG. 5A, in one embodiment the fluid passage 118 may include multiple passes having relatively long axial portions 132*a-c* interconnected at ends thereof by relatively short leg portions 134*a-b*. The fluid passage 118 may include an inlet path 136 for providing fluid communication between inlet 120 and an axial portion, such as axial portion 132*a*. As noted above, the axial portions 132*a-c* and leg portions 134*a-b* may be configured as cylindrical bores which may be formed through drilling of the block member 100. The configuration of fluid passage 118 as shown in FIG. 5A is exemplary and other configurations are contemplated to be within the scope of the invention. The size, length and number of passes (e.g., axial portions 132) may be selected based on the specific application and may be determined by one of ordinary skill in the art. These design variables, however, should be selected such that at the maximum design flow rate of viscous material through the dispensing apparatus 10 (and thus through the heat exchanger 92), the viscous material has a residence time therein that allows a substantial portion of the viscous material to be at or at least near the ideal dispensing temperature prior to the material entering the fluid chamber 48. In one embodiment, an iterative design process may be used to configure the heat exchanger 92.

For example, an exemplary process for configuring the heat exchanger 92 might include; i) initially setting the size and length (accounting for number of passes) of the fluid passage 118; ii) calculating a thermal time constant ($T_c$) for the particular viscous material being dispensed and occupying the volume of the fluid passage 118; and iii) verifying that at the maximum design flow rate of the viscous material through the dispensing apparatus 10, the material has a residence time in the heat exchanger 92 that is a factor of N times greater than the thermal time constant ($T_c$). For example, it is contemplated that factor N greater than or equal to two (2), and more preferably greater than or equal to three (3), would ensure to a relatively high degree that a substantial portion of the viscous material would be at the desired uniform temperature, such as at a temperature that is at or near the ideal dispensing temperature, prior to the material entering the fluid chamber 48. If the initial configuration does not satisfy the residence time criteria, then the heat exchanger configuration may be adjusted until the residence time criteria is satisfied. Of course increasing the residence time of the viscous material in the heat exchanger 92, such as to have a factor of approximately five (5), (i.e., N=5) for example, would further insure that the viscous material is at the desired uniform temperature prior to it reaching the fluid chamber 48. Further increases in the factor N, however, may have diminished returns as the size of the heat exchanger 92, and thus main body 16 may become prohibitive. The iterative process described above is exemplary and those of ordinary skill in the art may recognize other methods and processes to ensure that a substantial portion of the viscous material is at the desired uniform temperature prior to it entering the fluid chamber 48.

As noted above, the heat exchanger portion 104 includes a heater 122 for heating the viscous material as it flows along fluid passage 118. In this regard, the heat exchanger portion 104 includes an elongate blind bore 138 open at a side surface 140 of main body 16. The bore 138 is closely spaced from the passes of the heat exchanger 92, such as being slightly above the fluid passage 118, and extending in a direction generally parallel to the axial portions 132 of the fluid path 118. The bore 138 receives the heater 122 therein, the heat being conducted through the main body 16 to heat the viscous material flowing through fluid passage 118. For example, the heater 122 may be a wire wound cartridge heater capable of generating about 15 Watts of power. Those of ordinary skill in the art will recognize, however, that other types of heaters may also be used. Moreover, those of ordinary skill in the art will further recognize that the heater 122 may be positioned at other locations and other orientations relative to the fluid passage 118 and remain effective for heating the viscous material flowing therethrough.

The heater 122 may be electrically coupled to a controller, such as controller 32, for controlling the amount of heat generated thereby. To this end, the heat exchanger portion 104 may further include a temperature-sensing device 142 for providing an output (e.g., electrical signal) indicative of the temperature of the viscous material in the fluid passage 118. As shown in FIG. 5B, the temperature-sensing device 142 may be positioned in an elongate blind bore 144 open at the side surface 140 of main body 16. The bore 144 may be positioned adjacent the last pass of the fluid passage 118, such as axial portion 132c, so that the sensed temperature correlates to the temperature of the viscous material just prior to it entering the fluid chamber 48. It should be recognized, however, that the temperature-sensing device 142 may be positioned at other locations and orientations relative to fluid passage 118 and remain effective for indicating a temperature of the viscous material flowing therethrough. The temperature-sensing device 142 may be electrically coupled to the controller 32 so as to establish a feedback system for controlling the heater 122. In one embodiment, the temperature-sensing device 142 may include, for example, one or more resistance temperature devices (RTDs) having a nominal rating of about 100 Ohms at room temperature. Those of ordinary skill in the art will recognize other temperature-sensing devices, such as thermistors, thermocouples, etc., that may effectively operate to control heater 122 and be within the scope of the invention.

In one aspect, the heater 122 and temperature-sensing device 142 may be potted within their respective bores 138, 144 so as to be in direct contact with a surface of the main body 16, which is in turn in direct contact with the viscous material flowing through fluid passage 118 and being dispensed from dispensing apparatus 10. In this way, the thermal resistance between the heat source and sensor and the viscous material is reduced as compared to more conventional systems. Accordingly, more accurate control of the heating of the viscous material in fluid passage 118 may be achieved.

In operation, the viscous material from reservoir 20 flows along inlet path 136 and enters inlet 120 under pressure from fluid source 28. The material then flows along the serpentine flow passage 118 by serially traversing portions 132a, 134a, 132b, 134b, and 132c. As the material flows along these portions, the heater 122 heats the viscous material. The temperature-sensing device 142 senses a temperature indicative of the temperature of the viscous material, especially as it flows along axial portion 132c. Based on the output from temperature-sensing device 142, the controller 32 can increase or decrease the heat generated by heater 122 as necessary. As discussed above, the heat exchanger 92 may be configured such that at the maximum design flow rate of apparatus 10, the viscous material has a residence time in the heat exchanger 92 that satisfies the residence time criteria (e.g., at least two (2) times, and preferably at least three (3) times, the thermal time constant $T_c$ of the viscous material resident in the heat exchanger). Thus, when the viscous material reaches the inlet 50 to the fluid chamber 48, a substantial portion of the viscous material has been heated to the desired uniform temperature. As discussed above, this desired uniform temperature may be about the ideal temperature for dispensing the desired amount of material, by either weight or volume, for example.

In addition to heating the viscous material flowing through fluid passage 118, heater 122 may be sufficiently positioned relative to the fluid chamber 48 so as to provide at least some heating to the material resident therein. As noted above, in some applications, the heater 90 adjacent the dispensing end of dispensing module 12 may not be sufficient to overcome the temperature variations in the viscous material due to heat loss along the upper portion of the fluid chamber 48. As best shown in FIG. 2, some of the heat from heater 122 may be conducted through the main body 16 so as to effectively heat the viscous material in fluid chamber 48 along an upper portion thereof. In other words, because the heat exchanger 92 is integrally formed with the dispensing module 12, the heat exchanger 92 is in thermal communication with the dispensing module 12 via a relatively large conduction path and is capable of providing heat thereto. Thus, in combination, the fluid chamber 48 may be heated along the upper portion by heater 122 and may also be heated along a lower portion by heater 90. By providing heating to the fluid chamber 48 along the upper and lower portions (i.e., effectively bounding the fluid chamber 48 with heat sources), the dispensing module 12 becomes more isothermal and temperature variations in the viscous material contained therein may be eliminated or reduced.

In another aspect in accordance with embodiments of the invention, the heat exchanger 92 may be designed to facilitate cleaning of the fluid passage 118. In this regard, the main body 16 may include one or more access ports that provide access to the fluid passage for cleaning thereof. As shown in FIG. 5A, each of the axial portions 132a-c includes an access port 146a-c in communication with a respective axial portion and open along a surface of the main body 16, such as along side surface 140. The access ports 146 are closed by removable plugs 148, such as threaded plugs. The ports 146 or plugs 148 may include suitable seals, such as O-rings, to ensure a fluid tight seal between the plugs and access ports. The access ports 146 extend generally parallel to the axial portions 132 such that when a cleaning tool (not shown) is inserted through an access port, the tool may traverse substantially the entire length of the axial portion.

In a similar manner, the leg portions 134a-b and inlet path 136 may likewise include access ports 150a-b and 152, respectively, in communication with a respective leg portion 134 or inlet path 136 and open along a surface of the main body 16, such as along front or rear surfaces 154, 156. The access ports 150, 152 are also closed by removable plugs 148. The access ports 150, 152 extend generally parallel to the leg portions 134 and inlet path 136 such that when a cleaning tool (not shown) is inserted through an access port, the tool may traverse substantially the entire length of the leg portion or inlet path. Collectively, the access ports 146, 150, 152 allow substantially the entire fluid passage 118 of the heat exchanger 92 to be cleaned. As shown in FIG. 5A, the access ports may be countersunk relative to the main body surfaces 140, 154, 156 so that the heads of the plugs 148 do not project therebeyond.

FIGS. 6-11B illustrate another embodiment of a dispensing apparatus 210 incorporating a heat exchanger in close proximity to the inlet 250 to the fluid chamber 248 and in thermal communication with the dispensing module 212. Operation of the dispensing apparatus 210 is similar to the operation of apparatus 10 described above. For this reason, reference numerals in these figures that correspond to similar features in FIGS. 1-5B have been preceded with a two (2). Moreover, because the fundamental operation of the dispensing apparatus 210 is similar to that explained above, a detailed description of its structure and operation will not be repeated here. More specific details of the dispensing apparatus 210 may be found in pending U.S. patent application Ser. No. 11/328,378 the disclosure of which is incorporated by reference herein in its entirety, and which is assigned to the assignee of the present application. Instead, the description that follows will focus on the details of the heat exchanger and its incorporation into the dispensing apparatus 210.

Similar to the previous embodiment, the fluid conduit line that typically couples the outlet of the reservoir 220 to the inlet 250 of the fluid chamber 248 has been replaced with or at least includes a heat exchanger assembly 300 adapted to provide a substantial portion of the viscous material to the fluid chamber 248 at a uniform temperature that is at or at least near the ideal temperature for dispensing the desired amount of material. In this embodiment, however, the heat exchanger assembly 300 is not integrally formed with the body of the module 212, but instead may be a separate component at least a portion of which is capable of being removably secured to the dispensing apparatus 210, as discussed in more detail below.

In this regard, in one embodiment the heat exchanger assembly 300 may have a modular design including a heating module 302 and a fluid transport module 304, the two modules 302, 304 being separable from one another in one embodiment. In an alternative embodiment, however, the heating module 302 and fluid transport module 304 may be formed as a unitary structure or otherwise fixedly secured together prior to securing the assembly 300 to dispensing apparatus 210. The heating module 302 includes a generally rectangular body 306 made from aluminum, stainless steel, or other high thermally conductive materials. The heating module body 306 includes an upper surface 308 adapted to engage the dispensing apparatus 210. More particularly, the heating module 302 may be coupled to junction box 309 of the dispensing apparatus 210 positioned between reservoir 220 and solenoid 230. The junction box 309 may likewise be formed from aluminum, stainless steel, or other high thermally conductive materials (e.g., higher than approximately 3 BTU/(hr ft ° F.)). Various electrical cables and fluid conduits (not shown) servicing dispensing apparatus 210 are interfaced to apparatus 210 at the junction box 309, which acts as a centralized distribution point for power and fluid to dispensing module 212 and solenoid valve 230.

Figure 7:
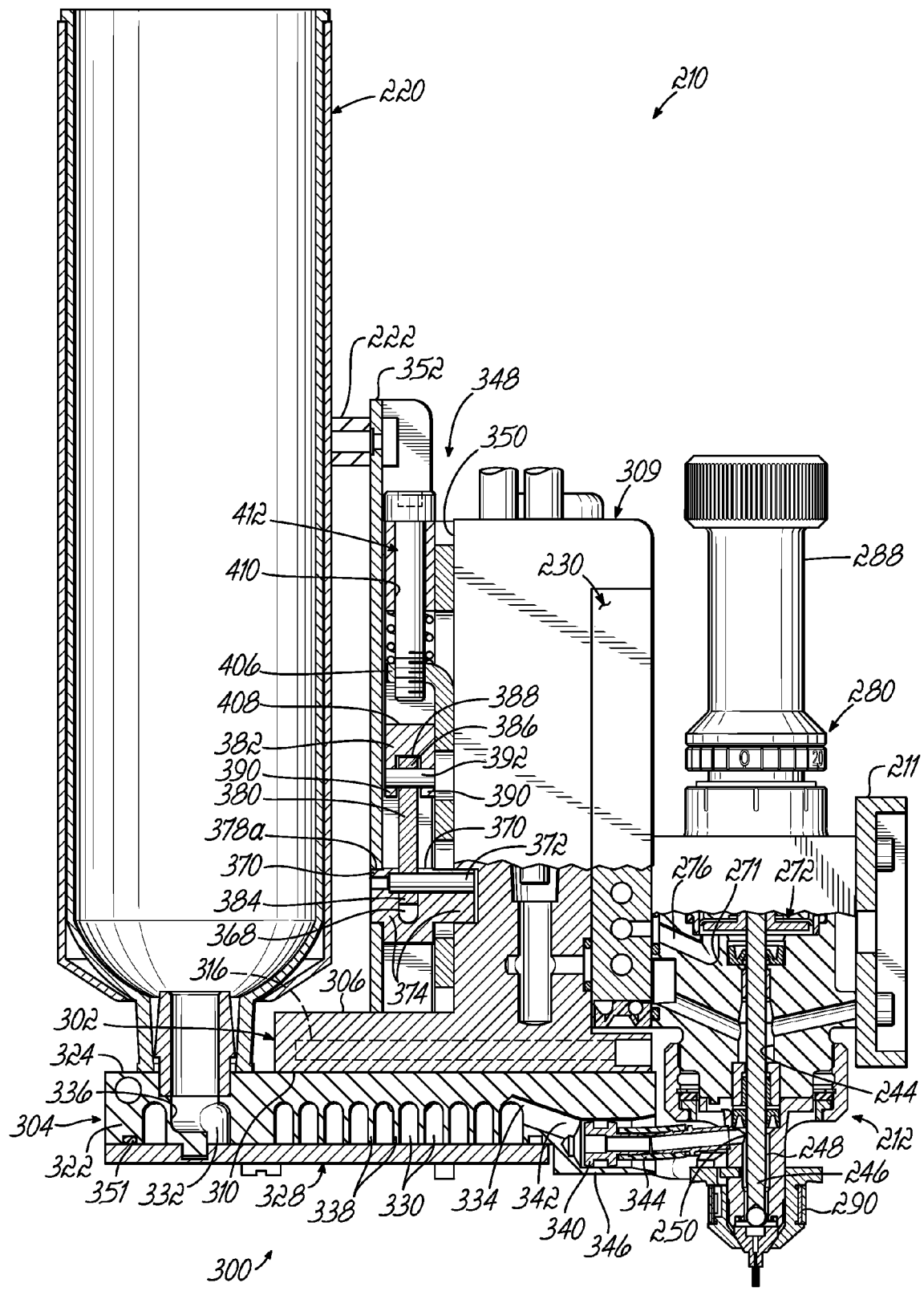
FIG. 7 is a partial cross-sectional view of the dispensing apparatus shown in FIG. 6.

In one embodiment, the heating module 302 may be separable from the junction box 309. Thus, for example, the heating module 302 may be clamped to the junction box 309, such embodiment being discussed in more detail below. Alternatively, the heating module 302 may be secured to the junction box 309 such as by threaded fasteners. Still further, the junction box 309 and the heating module 302 may be formed as an integral or unitary structure, as illustrated in FIG. 7. In any event, the heating module 302 may be positioned such that a lower surface 310 thereof is in thermal communication with the fluid transport module 304. For example, the lower surface 310 of the heating module 302 may directly contact the fluid transport module 304, although not being so limited. For example, a generally compliant, thermally conductive pad, thermal grease, or other suitable materials may be positioned between the heating and fluid transport modules 302, 304 that provide good thermal communication therebetween.

Figure 11A:
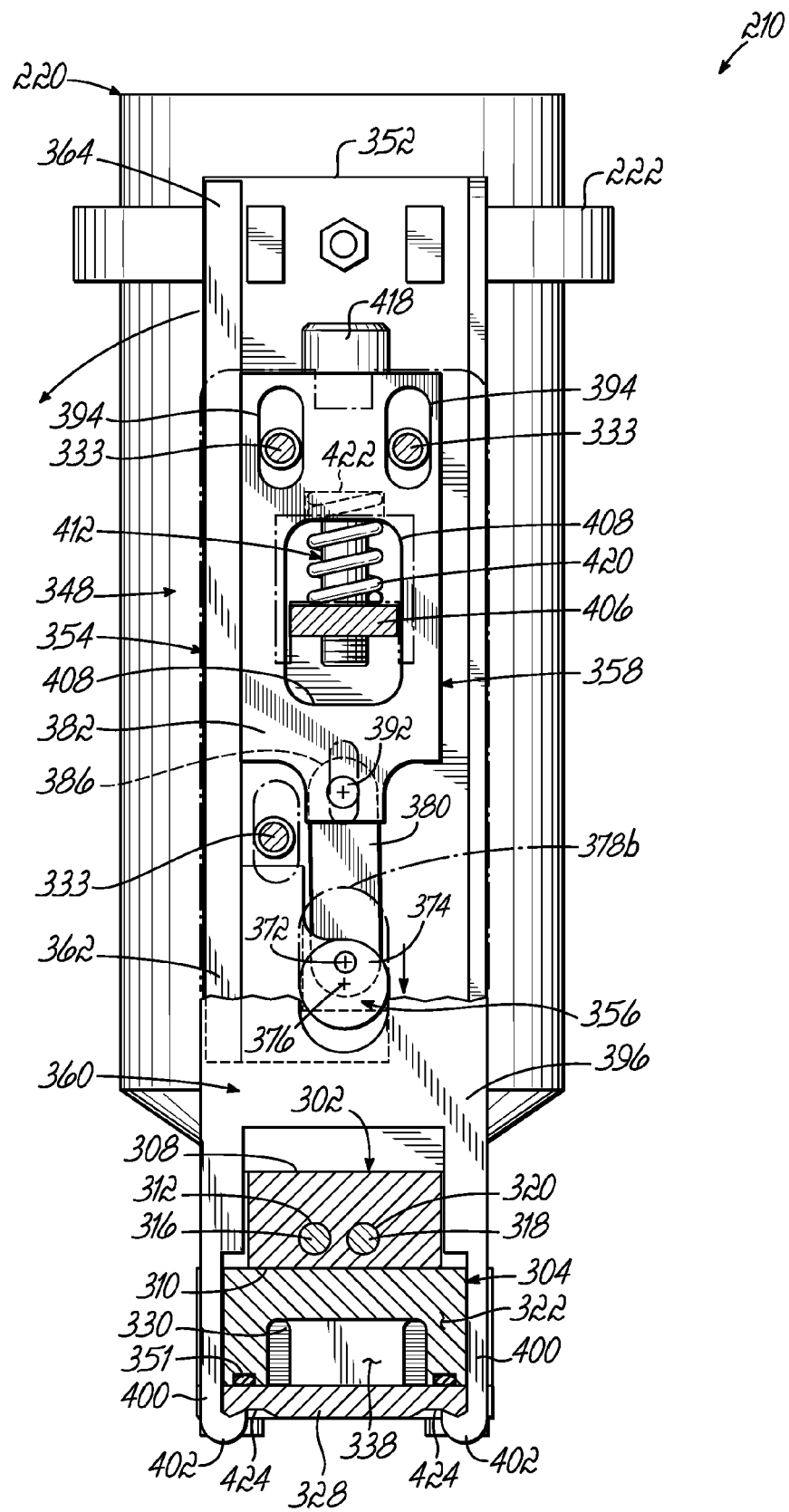
FIG. 11A is a partial cross-sectional view of the dispensing apparatus shown in FIG. 6 showing the clamping mechanism in the closed position.
Figure 11B:
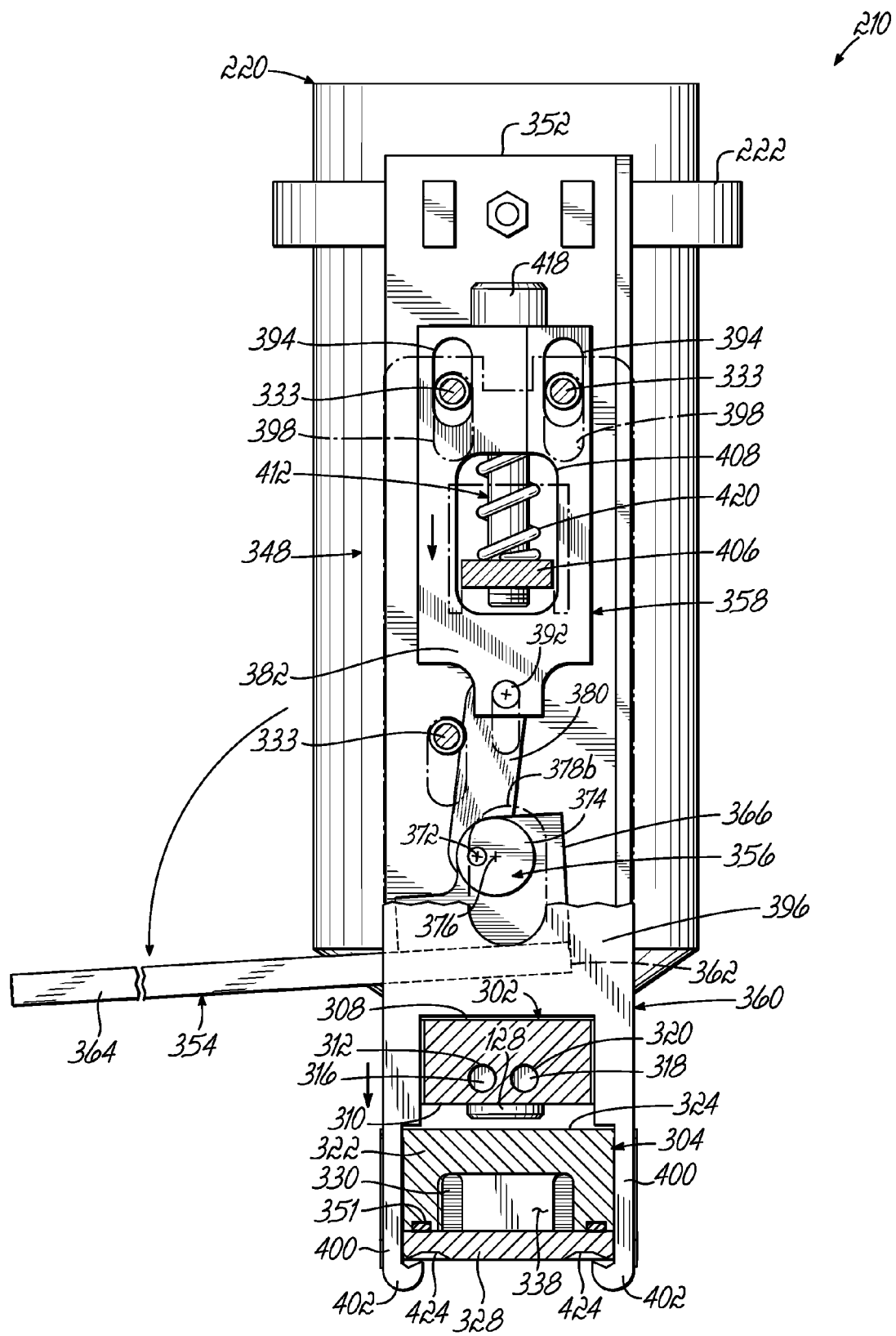
FIG. 11B is a partial cross-sectional view similar to 11A showing the clamping mechanism in the open position.

The heating module body 306 includes an elongate blind bore 312 (FIGS. 11A and 11B) open at a side surface 314 of body 306. The bore 312 is adapted to receive a heater 316 therein, the heat being conducted through the heating module body 306 to heat the fluid transport module 304, and more specifically, the viscous material flowing through the fluid transport module 304 as discussed in more detail below. The heater 316 may be similar to heater 122 as described above. The heater 316 may be electrically coupled to a controller (not shown) for controlling the amount of heat generated thereby. To this end, the heating module 302 may further include a temperature-sensing device 318 for providing an output indicative of the temperature of the viscous material in the fluid transport module 304. As shown in FIGS. 11A and 11B, the temperature-sensing device 318 may be positioned in an elongate blind bore 320 open at the side surface 314 of heating module body 306. The temperature-sensing device 318 may be electrically coupled to the controller so as to establish a feedback system for controlling the heater 316. The temperature-sensing device 318 may be similar to that described above for temperature-sensing device 142.

The fluid transport module 304 includes a generally rectangular body 322 made from aluminum, stainless steel, or other high thermally conductive materials. The fluid transport module 304 includes an upper surface 324 adapted to be in thermal communication with the heating module 302 so that the heat generated by heater 316 may be communicated to the viscous material flowing through the fluid transport module 304. For example, the upper surface 324 of the fluid transport module 304 may directly contact the lower surface 310 of the heating module 302, although not being so limited. Again, a thermally conductive pad, thermal grease or other suitable material may be positioned therebetween that provides good thermal communication. The lower surface of the fluid transport module 304 may be defined by a removable cover plate 328, which may be coupled to body 322 through tool-less means, and provide access to a fluid passage through the fluid transport module 304, as explained in more detail below.

Figure 8:
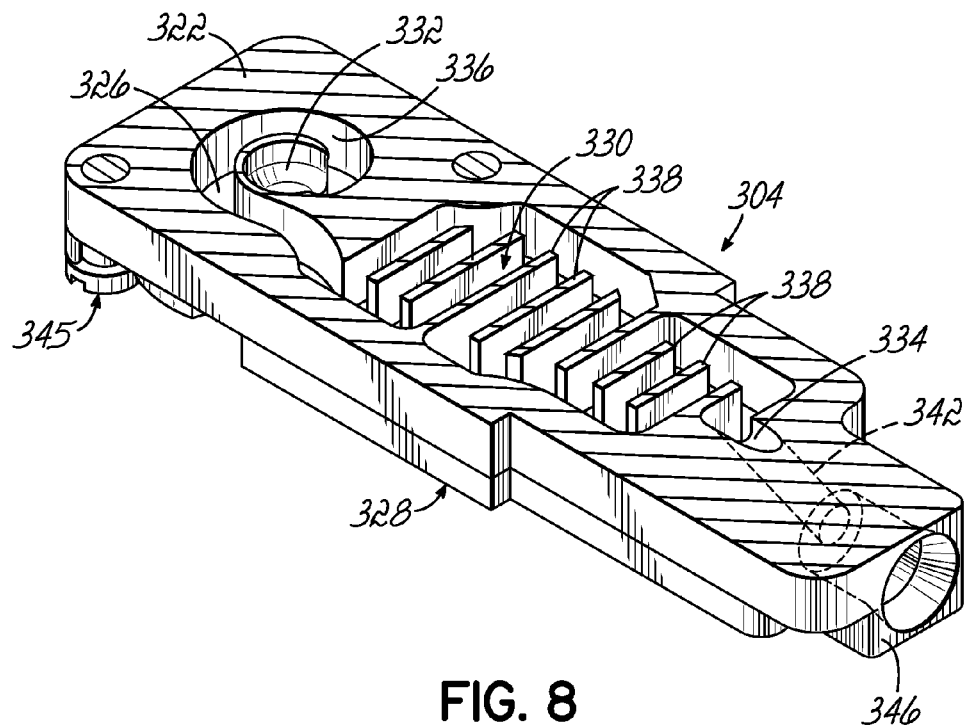
FIG. 8 is a partial cross-sectional view of the heat exchanger shown in FIG. 6.

As best illustrated in FIGS. 7 and 8, the fluid transport module 304 includes a fluid passage 330 extending between an inlet 332 and an outlet 334, which is in fluid communication with the fluid chamber 248 in module 212. The inlet 332 is in fluid communication with an aperture 336 in the upper surface 324 of the fluid transport module 304 adapted to receive an end of the reservoir 220 so that viscous material in the reservoir 220 is in fluid communication with the fluid passage 330. By way of example, the coupling between the fluid transport module 304 and the reservoir 220 may be facilitated by a connector similar to connector 126 previously discussed.

As in the previous embodiment, the fluid passage 330 defines a tortuous or serpentine path through the fluid transport module 304. In this embodiment, however, the serpentine path has a different design. More particularly, in the previous embodiment, the fluid passage 118 was defined by a series of interconnected generally cylindrical bores (e.g., axial portions 132a-c and leg portions 134a-b). For some high flow rate applications, however, such a heat exchanger design may not be sufficient for bringing the viscous material at or near the ideal dispensing temperature under the apparatus space constraints. For example, the cylindrical bore design for fluid passage 118 may not provide the required fluid contact surface area for the high flow rates mandated by the specific application. For such high flow rate applications and other applications where a cylindrical bore design of the fluid passage may provide insufficient surface area, the heat exchanger may include a more complex finned design adapted to increase the fluid contact area under the apparatus space constraints. To this end, the fluid transport module 304 includes a plurality of fins 338 that define the walls of a tortuous U-shaped channel. The flow passage 330 is open along the lower end thereof and is closed by the cover plate 328. The flow passage 330 may be formed in the body 322 of fluid transport module 304 during casting of the module 304 or during subsequent processing, such as milling or other processes as known to those of ordinary skill in the art.

As in the previous embodiment, the size, length, and number of passes of the heat exchanger may be selected based on the specific application and may be determined by one of ordinary skill in the art. The design variables, however, should be selected such that at the maximum design flow rate of viscous material through the dispensing apparatus 210 (and thus through the heat exchanger), the viscous material has a residence time therein that allows a substantial portion of the material to be at or at least near the ideal dispensing temperature prior to the material entering the fluid chamber 248 in dispensing module 212. For example, the iterative design process as described above may be used such that the viscous material has a residence time in the heat exchanger that is at least two (2), and preferably at least three (3), times the thermal time constant ($T_c$) of the viscous material in the heat exchanger at the maximum design flow rate. This will ensure that a substantial portion of the viscous material in the heat exchanger has reached the desired uniform temperature (e.g., at or near the ideal dispensing temperature).

As noted above, in this embodiment the fluid transport module 304 is not integrally formed with the dispensing module 212 but is separable therefrom. To facilitate fluid communication between the fluid transport module 304 and the fluid chamber 248 in dispensing module 212, yet allow the fluid transport module 304 to be separable therefrom, the fluid transport module 304 may include a flexible coupling 340. The flexible coupling 340 includes a first end in fluid communication with the outlet of fluid passage 330, such as via an exit passage 342. A second end of the flexible coupling 340 may be coupled to a fitting 344 on dispensing module 212, which is in fluid communication with the inlet 250 to fluid chamber 248. The flexible coupling 340 may couple to the fitting 344 in a slip-fit manner and form a fluid tight seal therewith. So as to align the flexible coupling 340 with the fitting 344 (which would otherwise receive the viscous material through a fluid conduit line), the flexible coupling 340 may be positioned in a lower body portion 346 of the fluid transport module 304. The lower body portion 346 surrounds the flexible coupling so as to prevent or reduce any heat loss (and resulting temperature variations) as the material flows through the coupling.

In operation, the viscous material from reservoir 220 enters inlet 332 under pressure from a pressurized fluid source (not shown). The material then flows along the serpentine flow passage 330 defined at least in part by the fins 338. As the material flows along flow passage 330, the heater 316 in heating module 302 heats the viscous material. The increased fluid contact surface area created by the finned design provides enhanced heat transfer to the viscous material even for high flow rate applications. The temperature-sensing device 318 senses a temperature indicative of the temperature of the viscous material flowing through flow passage 330. Based on the output from temperature-sensing device 318, the controller can increase or decrease the heat generated by heater 316 as necessary. The viscous material then flows through the outlet 334 of the fluid passage 330, through the exit passage 342, through the flexible coupling 340, through the fitting 344 and into the fluid chamber 248.

As discussed above, the heat exchanger may be configured such that at the maximum design flow rate through apparatus 210, the viscous material has a residence time in the heat exchanger that satisfies the residence time criteria (e.g., at least two (2), and preferably three (3), times the thermal time constant $T_c$ of the viscous material resident in the heat exchanger). Thus, when the material reaches the inlet 250 to the fluid chamber 248, a substantial portion of the viscous material has been heated to the desired uniform temperature. As discussed above, this desired uniform temperature may be about the ideal temperature for dispensing the desired amount of material, by either weight or volume, for example.

In addition to heating the viscous material flowing through fluid passage 330, heater 316 may be sufficiently positioned relative to the fluid chamber 248 so as to provide at least some heating to the viscous material resident therein. As noted above, in some applications, the heater 290 adjacent the dispensing end of dispensing module 212 may not be sufficient to overcome the temperature variations in the viscous material due to heat loss along the upper portion of the fluid chamber 248. As best shown in FIG. 7, some of the heat from heater 318 may be conducted through the dispensing apparatus 210 and into the dispensing module 212 so as to effectively heat the viscous material in fluid chamber 248 along an upper portion thereof. In other words, the heating module 302 is coupled to the dispensing apparatus 210 so that a relatively large conduction path exists between the heating module 302 and dispensing module 212. For example, as illustrated, the heat from heater 318 may be conducted into the junction box 309, through solenoid valve 230, and into dispensing module 212. As noted above, these structures may be made of thermally conductive materials so that heat may readily flow from heating module 302 to the dispensing module 212. For example, the structures through which the conduction path is defined may have a thermal conductivity of no less than approximately 3 BTU/(hr ft ° F.). Thus, in combination, the fluid chamber 248 may be heated along the upper portion by heater 318 and may also be heated along a lower portion by heater 290. By providing heating to the fluid chamber 248 along the upper and lower portions (i.e., effectively bounding the fluid chamber 248 with heat sources), the dispensing module 212 becomes more isothermal and temperature variations in the material contained therein may be eliminated or reduced.

As in the previous embodiment, the heat exchanger may be designed to facilitate cleaning of the fluid passage 330. In this regard, at least the fluid transport module 304 may be selectively removable from the dispensing apparatus 210. For example, as discussed in more detail below, the fluid transport module 304 may be coupled to the lower portion of the junction box 309 by a clamping mechanism. Additionally, the flexible coupling 340 may be removed from the fitting 344 and the reservoir 220 may be removed from the aperture 336. It should be recognized that if the fluid transport module 304 is separable from the heating module 302, only the fluid transport module 304 may be removed for cleaning. The heating module 302 may either be removed or remain coupled to the junction box 309 depending on the specific embodiment as discussed above.

Figure 9A:
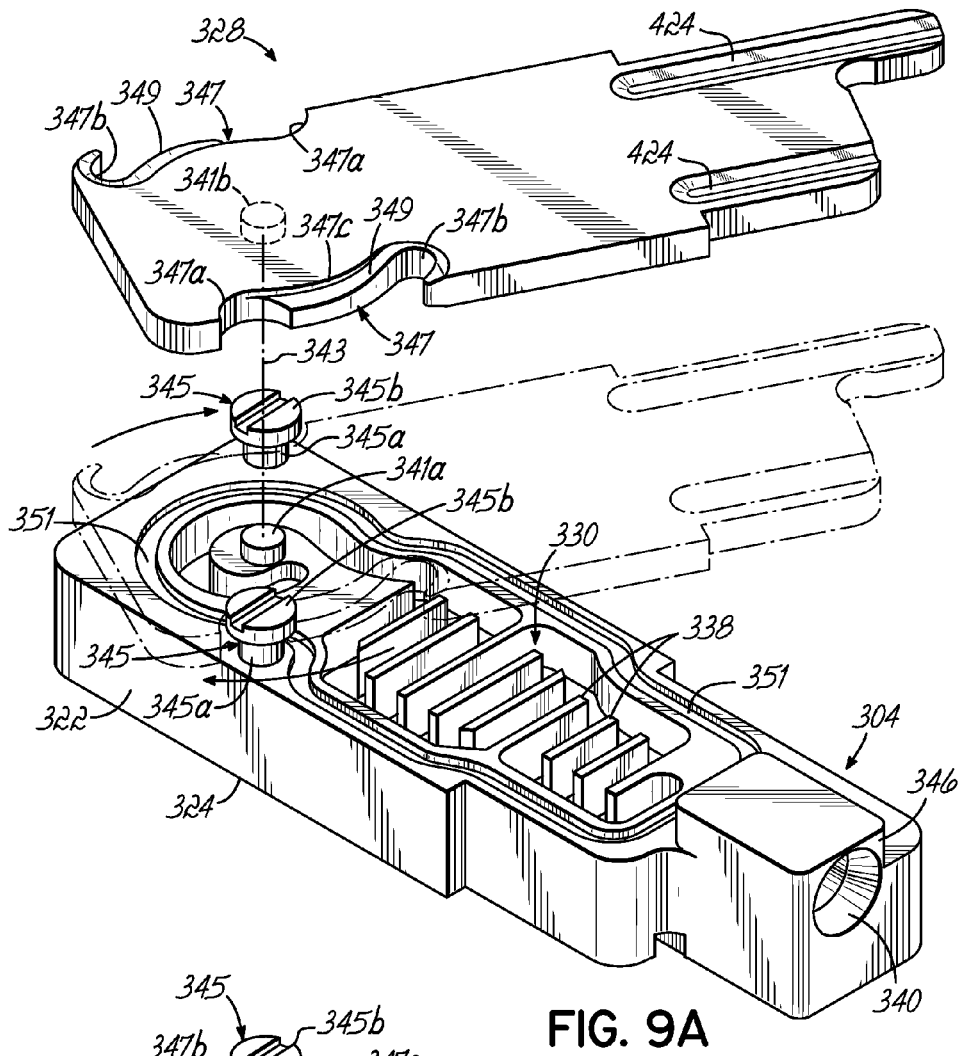
FIG. 9A is a perspective view of the fluid transport module with the cover plate in the open position.
Figure 9B:
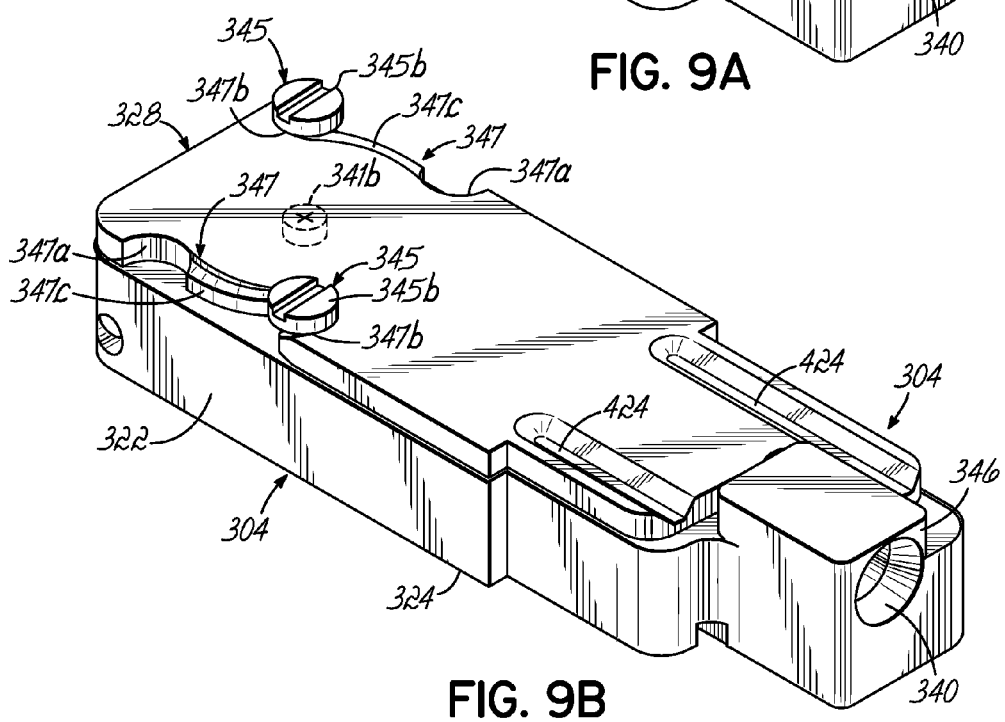
FIG. 9B is a perspective view similar to FIG. 9A with the cover plate in the closed position.

With at least the fluid transport module 304 removed from the dispensing apparatus 210, the cover plate 328 may be removed from the body 322 to expose the fluid passage 330. In this regard, the cover plate 328 may be coupled to the body 322 in a tool-less manner. For example, as illustrated in FIGS. 9A and 9B, in one embodiment the cover plate 328 may be rotatable relative to the body 322 between an open position (shown in phantom in FIG. 9A) and a closed position covering the fluid passage 330 (FIG. 9B). To this end, the fluid transport module 304 may include a projection 341a that is received within a recess 341b in the cover plate 328 and which operates as a pivot axis 343 for the cover plate 328 to rotate relative to body 322. The open and closed positions are defined by a pair of posts or studs 345 that cooperate with corresponding slots 347 in the cover plate 328. The posts 345 are offset from each other and arranged such that the pivot axis 343 is at the midpoint of the line or chord that connects the posts 345. Each of the posts 345 includes a stem portion 345a and an enlarged head portion 345b. Each of the slots 347 includes a pair of U-shaped end portions 347a, b connected by an arcuate intermediate portion 347c.

In operation and as illustrated in FIG. 9A, to couple the cover plate 328 to the body 322, the cover plate 328 is angled relative to the body 322 so that the U-shaped end portions 347a align with the head portions 345b of the posts 345. The end portions 347a are sized so as to be larger than head portions 345b so that the cover plate 328 may be seated on the body 322. Such a position is illustrated in phantom in FIG. 9A. The cover plate 328 may now be moved toward the closed position by rotating the cover plate 328 about the axis 343. As the cover plate 328 is rotated, the stem portions 345a traverse the arcuate intermediate portions 347c until reaching the other U-shaped end portions 347b. This position is shown in FIG. 9B. The end portions 347b are sized so as to be smaller than the head portions 345b of posts 345 so as to prevent movement of the cover plate 328 away from the body 322 (e.g., upward direction in reference frame shown in FIG. 9B). To facilitate securement of the cover plate 328 to body 322, the arcuate intermediate portions 347c may include a cam surface 349 that provides an increasing clamping force as the cover plate 328 moves to the closed position and stem portions 345a move toward the U-shaped end portions 347b therealong. Moreover, to facilitate a fluid tight seal between the cover plate 328 and the body 322 of fluid transport module 304, one of the body 322 or the cover plate 328 (body shown in FIG. 9A) may include a groove 351 for receiving an O-ring or other sealing member.

When it is desired to clean the fluid passage 330, the cover plate 328 may be removed by rotating the cover plate 328 in the opposite direction (e.g., counterclockwise direction) such that the heads 345b of studs 345 are positioned in the larger U-shaped end portions 347a. The cover plate 328 may then be moved away from body 322 to expose the fluid passage 330. The fluid passage 330 may then be cleaned of the viscous material in a manner generally known to those of ordinary skill in the art. The cover plate 328 may be re-attached to the body 322 in the manner described above and the fluid transport module 304 coupled to the dispensing apparatus 210 for use in a subsequent, and possibly different, dispensing process.

In some dispensing apparatus designs, it may be desirable to make the assembly/disassembly of the apparatus tool-less or as nearly tool-less as possible. For example, the dispensing module shown in FIGS. 6-11B, and more fully described in U.S. patent application Ser. No. 11/328,378, includes a tool-less aspect thereto. Accordingly, it may be desirable to have the heat exchanger assembly 300 (i.e., either the fluid transport module 304, the heating module 302, or both) couple to the dispensing apparatus 210 in a tool-less manner.

Figure 10:
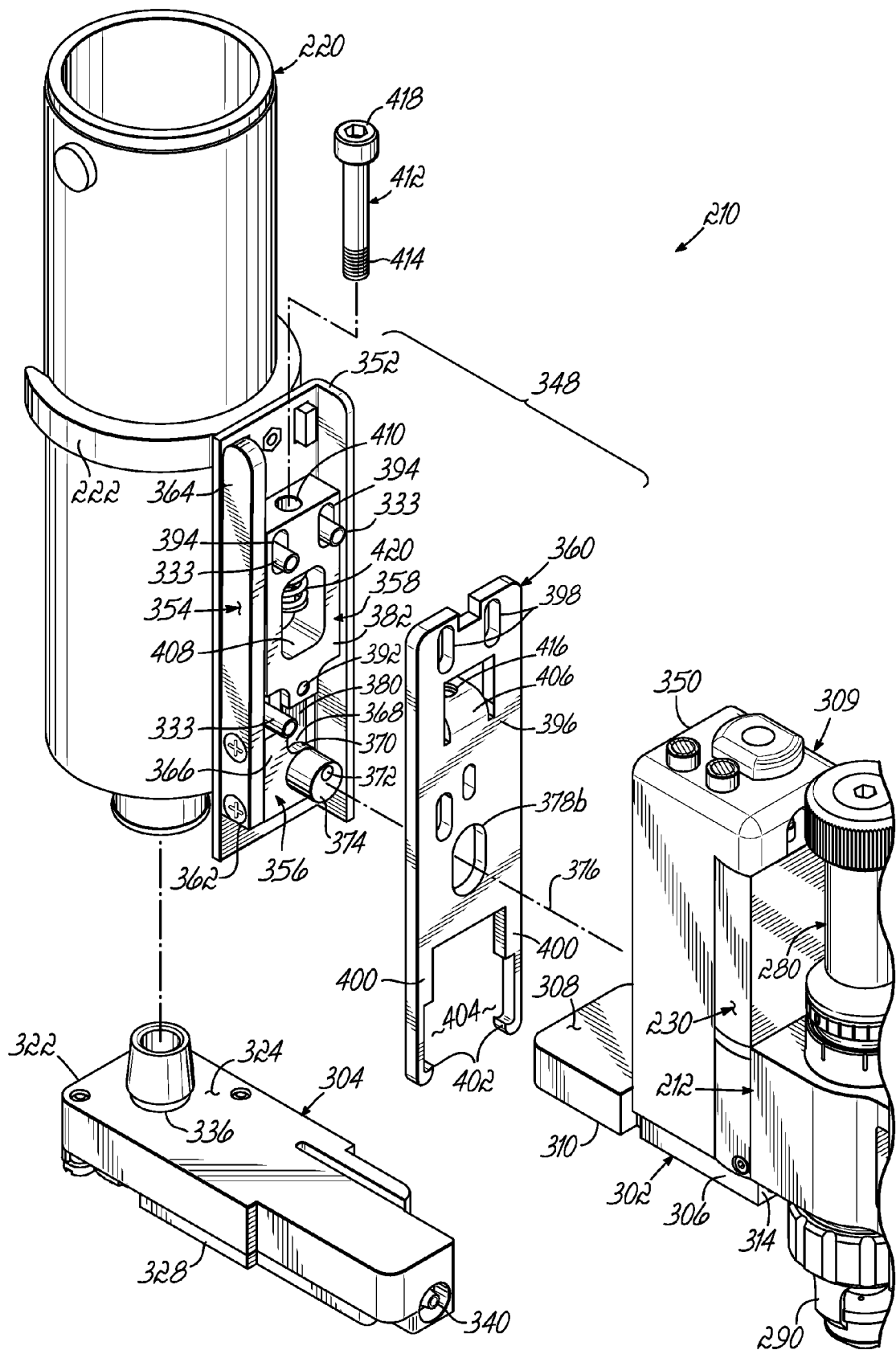
FIG. 10 is a partial disassembled perspective view of the dispensing apparatus shown in FIG. 6.

To this end and as shown in FIGS. 10-11B, the dispensing apparatus 210 may include a clamping mechanism, generally shown at 348, for clamping at least the fluid transport module 304 to the dispensing apparatus 210, and more particularly, to the lower portion of the junction box 309. As shown in FIG. 10, the clamping mechanism 348 is positioned between an outer wall 350 of the junction box 309 and a support wall 352 spaced therefrom. The support wall 352 includes bracket 222 for supporting the reservoir 220 relative to the dispensing module 212. The support wall 352 may be coupled to the junction box 309 by one or more fasteners 333 extending through the clamping mechanism 348.

The clamping mechanism 348 includes a lever arm 354, a cam mechanism 356, a transmission member 358, and a clamping member 360. The lever arm 354 includes an elongate member having a first end 362 secured to the cam mechanism 356 and a second end 364 opposite the first end 362 adapted to be grasped by an operator. The lever arm 354 is movable between an open position (FIG. 11B), wherein the clamping member 360 releases at least the fluid transport module 304, and a closed position (FIG. 11A), wherein the clamping member 360 securely clamps at least the fluid transport module 304 to the dispensing apparatus 210. The details of how the movement of the lever arm 354 between the opened and closed position moves the clamping member 360 so as to release/retain at least the fluid transport module 304 will now be explained.

The cam mechanism 356 includes an L-shaped body 366 having a slot 368 defined by two spaced-apart ears 370. The ears 370 include apertures that receive a pin 372 therethrough so as to span the slot 368. The pin 372 is coupled to two generally circular hubs 374 at ends thereof that are rigidly affixed to the outer surfaces of the ears 370. The pin 372 is coupled to the hubs 374 so as to define an offset between the pin 372 and the central axis 376 of the hubs 374. The hubs 374 are received within apertures 378a, b in the support wall 352 and the clamping member 360, respectively, and are capable of rotating relative thereto about the central axis 376. Aperture 378a in support wall 352 may be a circular aperture that closely receives one hub 374 but permits relative rotation. Aperture 378b in clamping member 360 may be a slotted aperture that receives the other hub 374 in a manner that not only permits relative rotation, but also allows the clamping member to move relative to hub 374 along the slot 378b.

The cam mechanism 356 may be configured such that when the lever arm 354 is in the closed position, the pin 372, and thus the cam mechanism 356, is in a first position (FIG. 11A) that provides for clamping of at least the fluid transport module 304, and when the lever arm 354 is in the open position, the pin 372 and cam mechanism 356 are in a second position (FIG. 11B) that provides for releasing at least the fluid transport module 304 from the dispensing apparatus 210. By way of example, when in the first position, the pin 372 may be at a first vertical distance relative to the fluid transport module 304 and when in a second position, the pin 372 may be at a second vertical distance relative to the fluid transport module 304, wherein the second vertical distance may be less than the first vertical distance. More particularly, when in the first position, the pin 372 may be located at a ninety (90) degree angular position and when in the second position, the pin 372 may be located at a 180 degree angular position in the reference frame shown in FIGS. 11A and 11B. Accordingly, the vertical component (and thus the vertical distance relative to fluid transport module 304) of the pin 372 decreases as the cam mechanism 356 rotates between the first and second positions.

The clamping member 360 is coupled to the cam mechanism 356 via transmission member 358. The transmission member 358 includes a rod 380 and a head 382, and essentially transforms or converts the rotational movement of the cam mechanism 356 between its first and second positions into vertical movement of the clamping member 360 between a corresponding first and second position. In this regard, and in reference to FIG. 7, the rod 380 includes a first end 384 positioned in the slot 368 of the cam mechanism 356 and configured such that an aperture in the first end 384 receives the pin 372 therethrough such that the rod 380 is rotatable relative to pin 372. A second end 386 of the rod 380 may be coupled to the head 382 in a similar manner. In particular, the head 382 may include a slot 388 defined by two spaced-apart ears 390. The ears 390 include apertures that receive a pin 392 therethrough so as to span the slot 388. The second end 386 of the rod 380 is positioned in the slot 388 of the head 382 and configured such that an aperture in the second end 386 receives the pin 392 therethrough such that the rod 380 is rotatable relative to pin 392. Additionally, the head 382 includes at least one vertically-oriented slotted apertures 394 (two shown) adapted to slidably receive the fasteners 333 that couple the support wall 352 to the outer wall 350 of the junction box 309. The cooperation between the fasteners and the slotted apertures 394 limit the movement of the head 382 along a single axis, such as a vertical axis.

The clamping member 360 includes an elongate plate-like body 396 having two slotted apertures 398 along a first end portion thereof that align with slotted apertures 394 in head 382 and are likewise adapted to slidably receive the fasteners 333 that couple the support wall 352 to the outer wall 350 of the junction box 309. The cooperation between the fasteners and the slotted apertures 398 also limit the movement of the clamping member 360 along a single axis, such as the vertical axis. A second end portion of body 396 includes two arms 400 projecting therefrom and each terminating in inwardly directed J-shaped hooks 402. The arms 400 define a gap 404 therebetween adapted to receive at least the fluid transport module 304 of heat exchanger assembly 300. The gap 404 may also be configured to receive the heating module 302. As noted above, the body 396 of the clamping member 360 includes a slotted aperture 378b for receiving a hub 374 of cam mechanism 356. The slotted aperture 378b allows the clamping member 360 to move relative to the hub 374 along slotted aperture 378b, which may be oriented generally vertically.

The clamping member 360 may be adjustably coupled to the transmission member 358. In this regard, the body 396 of the clamping member 360 may further include a tab 406 projecting therefrom. For example, the tab 406 may project substantially perpendicular relative to the plane of the clamping member 360 and toward the transmission member 358. The head 382 of the transmission member 358 includes a cavity 408 adapted to receive the tab 406 therein. The head 382 further includes a bore 410 in communication with the cavity 408 and open along an outer surface of the head 382. A threaded fastener 412 may be inserted into the bore 410 via its opening such that a portion of the fastener extends into the cavity 408. More particularly, the fastener 412 extends into the cavity 408 such that a threaded stem portion 414 thereof is received within a threaded aperture 416 in the tab 406. A head portion 418 of fastener 412 is larger than the bore 410 and may include a countersunk hexagonal cavity for receiving a tool (not shown) for rotating the fastener 412. Moreover, a compression spring 420 may be coaxially disposed about the fastener 412 such that a first end of the spring 420 contacts the tab 406 and a second end of the spring 420 contacts a wall 422 that defines at least a portion of cavity 408. Such an arrangement allows clamping mechanism 348 to be adjusted.

In particular, the clamping mechanism 348 may be adjusted to vary the clamping force acting to clamp at least the fluid transport module 304 to the dispensing apparatus 210. In this regard, the fastener 412 may be rotated with a suitable tool (not shown) so as to move the clamping member 360 relative to the head 382 of the transmission member 358 by cooperation of the external threads on the stem portion 414 and the internal threads in the aperture 416 of tab 406. Rotating of the fastener 412 in a first direction increases the clamping force on the fluid transport module 304 and rotation in the opposite direction decreases the clamping force on the fluid transport module 304. Additionally, the spring 420 causes a separation force to be imposed between the tab 406 and the wall 422 such that when the actuator 358 is moved to the second position, such as by movement of the lever arm 354 to the open position, the clamping member 360 also moves to the second position by acting through the spring 420.

In operation, when the lever arm 354 is located in the open position, the cam mechanism 356, transmission member 358, and clamping member 360 are all positioned in the second position, and the fluid transport module 304 may be positioned in the gap 404 between the arms 400 of the clamping member 360. If the heating module 302 is not already secured to the dispensing apparatus 210, then the heating module 302 may also be positioned in the gap 404 between the arms 400, and generally above the fluid transport module 304. With the module(s) 304 (302) properly positioned relative to the clamping member 360, the lever arm 354 may be moved to the closed position. This rotates the cam mechanism 356 to the first position, which in turn causes the transmission member 358 and clamping member 360 to move along their axes to the first position. In the first position, the J-shaped hooks 402 on the arms 400 of the clamping member 360 engage grooves 424 formed in the cover plate 328 so as to clamp the fluid transport module 304, and in some embodiments, the combination of the fluid transport module 304 and heating module 302, to the dispensing apparatus 210, such as along the lower end of the junction box 309 (FIG. 11A). The reservoir 220 may be coupled to the fluid transport module 304 and the flexible coupling 340 may be coupled to the fitting 344 on dispensing module 212.

When it is desired to remove the fluid transport module 304 from the dispensing apparatus 210, such as for cleaning purposes, the lever arm 354 may be moved to the open position. This causes the cam mechanism 356 to rotate to its second position, which in turn causes the transmission member 358 and the clamping member 360 to also move to their second positions. When in the second position, the J-shaped hooks 402 on arms 400 may disengage from the grooves 424 in the cover plate 328 of the fluid transport module 304 (FIG. 11B). The fluid transport module 304, and possibly the heating module 302, may then be removed from the dispensing apparatus 210. The reservoir 220 may be removed from the fluid transport module 304 and the flexible coupling 340 may be uncoupled from the fitting 344. The cover plate 328 may then be removed from the fluid transport module 304 in the manner discussed above so as to expose the fluid passage 330 for cleaning or other treatment.

The clamping mechanism 348 as described above provides a tool-less assembly of at least the fluid transport module 304, and possibly the heating module 302, depending on the various embodiments, to the dispensing apparatus 210. Such a tool-less design may reduce assembly/disassembly time and may facilitate or simplify use and maintenance of the dispensing apparatus 210.

As illustrated in FIG. 7, the dispensing module 212 includes a seal 271 adjacent the fluid chamber 248 to prevent the pressurized viscous material from leaking into the actuation section of the module 212. As illustrated in FIG. 7, the seal 271 is typically a dynamic lip seal having a stationary contacting interface that provides a seal with the needle 246 as the needle moves between the open and closed positions. In other words, there is relative movement between the contacting interface of the seal 271 and an outer surface of the needle 246. In certain high-frequency applications, the relative movement between the dynamic seal 271 and needle 246 may operate as a heat source that may undesirably affect the temperature of the viscous material resident in the fluid chamber 248. For example, it is expected that operating the dispensing module 212 above approximately 20 Hz may result in undesirable heating of the viscous material. This value, however, is application specific and generally depends on several factors including the properties viscous material (e.g., viscosity vs temperature curve, thermal conductivity, etc.), size of the viscous material being dispensed, and possibly other factors. In this regard, it is believed that the heat generated by the interaction between the needle 246 and the dynamic seal 271 is conducted through the needle and into the viscous material in the fluid chamber 248. In any event, the end result is that the temperature of the viscous material in the fluid chamber 248 deviates from its ideal dispensing temperature (e.g., is typically higher than the ideal temperature) and the quality of the dispensing process is diminished.

Figure 12:
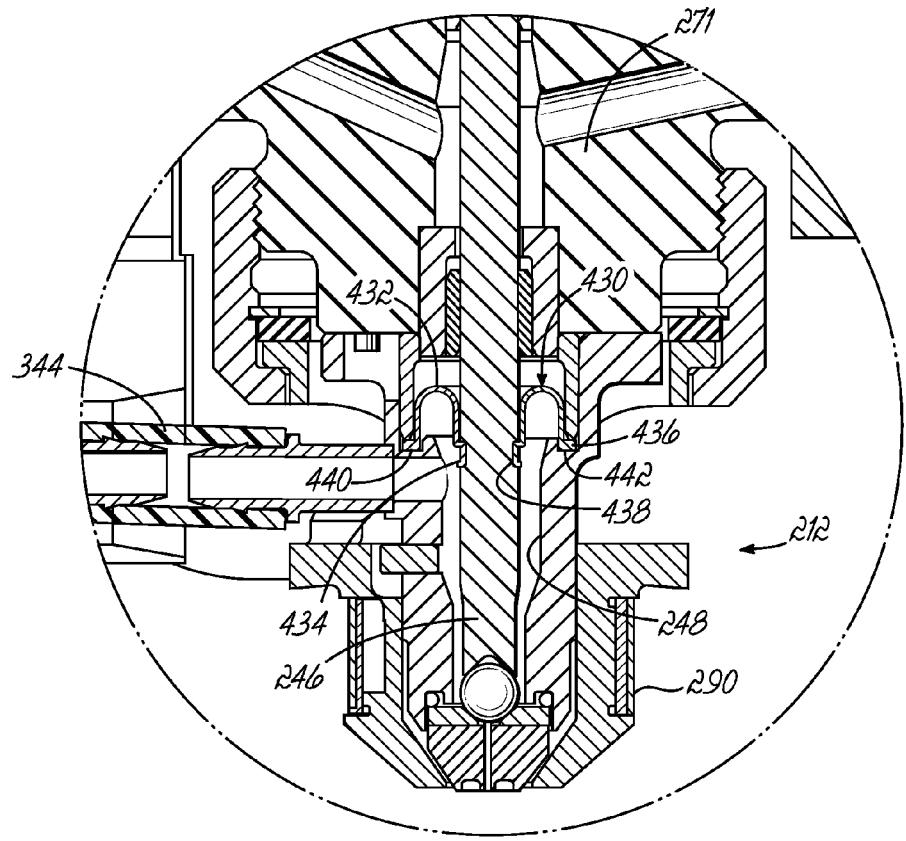
FIG. 12 is an enlarged view of the dispensing module shown in FIG. 7 having a static seal.

Accordingly, in such high-frequency applications, the dispensing apparatus 210 may be modified to address such heat generation between the seal and the moving needle. To this end, and as shown in FIG. 12, the dynamic seal 271 may be replaced with a static seal that effectively eliminates the relative movement between the seal and the needle, thus effectively eliminating the generation of heat at this location and the undesirable heating of the viscous material resident in the fluid chamber 248. Static seals are generally known in the art and in one embodiment may include a bellows seal 430 having a generally flexible body 432 defining an inner periphery 434 and an outer periphery 436.

The inner periphery 434 is rigidly fixed to the outer surface of the needle 246 such that the inner periphery 434 does not move relative to the needle 246, but instead moves with the needle 246 so that there is little to no relative movement therebetween. The inner periphery 434 may be coupled to the needle 246 in a manner as recognized by those of ordinary skill in the art. For example, in one embodiment, a clamp (not shown) may be used to secure the inner periphery 434 to the needle 246. Moreover, to facilitate the coupling between the inner periphery 434 and the needle 246, the needle 246 may include an annular groove 438 that provides a seat for clamping the inner periphery 434 thereto. Those of ordinary skill in the art may recognize other techniques to couple the inner periphery 434 to the needle 246.

The outer periphery 436 is rigidly fixed to the body of the dispensing module 212. In this regard, the outer periphery 436 may include a radially extending flange 440 received within a groove 442 in the dispensing module 212 and is secured thereto by compression of adjacent portions of the dispensing module 212 during, for example, assembly of the module 212. Unlike the inner periphery 434, the outer periphery 436 is stationary and does not move with the needle 246. The flexibly body 432 includes one or more convolutions that allow the inner periphery 434 to move relative to the outer periphery 436. Thus, the static bellows seal 430 provides a fluid tight seal that effectively prevents viscous material in the fluid chamber 248 from leaking into the actuation section of the dispensing module 212, and also effectively eliminates the source of heat generation associated with dynamic seals in high-frequency dispensing applications.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. An apparatus for dispensing a viscous material, comprising:
    an upper body;
    a needle valve mounted for reciprocating movement in said upper body, said needle valve having a vertical orientation;
    an actuator operatively coupled to said needle valve for reciprocating said needle valve;
    a heat exchanger including a heater, a vertically disposed fluid inlet, a fluid outlet, a serpentine path extending horizontally between said fluid inlet and said fluid outlet, and a vertically disposed bore laterally offset from said vertically disposed fluid inlet, said fluid outlet being disposed in a side wall of the bore, said upper body being assembled to said heat exchanger with said needle valve extending through said bore;
    a vertically disposed reservoir for the viscous material;
    a coupling connecting said reservoir to said heat exchanger to place said reservoir in fluid communication with said fluid inlet of said heat exchanger with said reservoir being laterally offset from said needle valve;
    a lower body, said lower body being assembled to said heat exchanger with said needle valve extending through said lower body, said lower body including a fluid chamber, said fluid outlet of said heat exchanger being in fluid communication with said fluid chamber; and
    a nozzle assembly coupled to said lower body, said nozzle assembly including a valve seat, and a discharge path connecting said valve seat to a discharge orifice, said needle valve extending through said nozzle assembly and being engageable with said valve seat, said discharge path being in fluid communication with said fluid chamber,
    wherein viscous material flows from said reservoir, through said serpentine path of said heat exchanger into said fluid chamber, and then from said fluid chamber through said discharge path and said discharge orifice, the material being heated while passing through said serpentine path, and
    wherein said needle valve is reciprocated by said actuator between an open position in which said needle valve is disengaged from said valve seat to allow material to flow through said discharge orifice, and a closed position in which said needle valve is engaged with said valve seat to prevent material flow from said discharge orifice.

2. The apparatus of claim 1, wherein said serpentine path is defined by at least one substantially cylindrical bore.

3. The apparatus of claim 1, wherein said heat exchanger includes at least one access port and a corresponding removable plug, said plug being selectively removable from said port to provide access to said serpentine path.

4. The apparatus of claim 1, wherein said heat exchanger is coupled to said apparatus such that a direct conduction path exists between said heater and said fluid chamber.

5. A method of dispensing a viscous material onto a workpiece, comprising:
    providing the viscous material to a vertically disposed fluid inlet of a heat exchanger from a reservoir in fluid communication with the fluid inlet;
    causing the viscous material to flow along a horizontally disposed serpentine path formed in the heat exchange which extends between the fluid inlet and a vertically disposed bore laterally offset from the fluid inlet and having a fluid outlet formed in a side wall of the bore;
    heating the viscous material as it flows along the serpentine path;

providing the heated viscous material from the fluid outlet of the heat exchanger to a fluid chamber of a dispensing module which is in fluid communication with the fluid outlet, the dispensing module having a reciprocating needle valve extending through the bore of the heat exchanger and through the fluid chamber; and providing the heated viscous material from the fluid chamber to a discharge path and discharge orifice of a nozzle assembly so as to be deposited on the workpiece.

6. The method of claim 5, wherein heating the viscous material further comprises:

heating the viscous material flowing along the serpentine path to a substantially uniform temperature approximately equal to an ideal temperature for dispensing a desired amount of viscous material.

7. The method of claim 5, wherein heating the viscous material further comprises:

maintaining the viscous material in the heat exchanger for a residence time that is at least two times greater than the thermal time constant of the viscous material in the heat exchanger.

8. The method of claim 6, further comprising:

heating the viscous material resident in the fluid chamber of the dispensing module using a heater of the heat exchanger.

9. The method of claim 8, further comprising:

conducting heat from the heater of the heat exchanger to the fluid chamber along a conduction path defined therebetween.

10. The method of claim 5, further comprising:

cleaning substantially the entire serpentine path in the heat exchanger.

11. The method of claim 10, wherein the serpentine path is cleaned without removing the heat exchanger from the dispensing module.

12. The method of claim 10, further comprising:

removing at least one removable plug from an access port for accessing the serpentine path in the heat exchanger.

* * * * *